United States Patent
Devos et al.

(10) Patent No.: US 8,833,026 B2
(45) Date of Patent: Sep. 16, 2014

(54) COVERING, AS WELL AS PANELS AND AUXILIARY PIECES USED THEREWITH

(75) Inventors: Pieter Devos, Koolskamp (BE); Mark Cappelle, Staden (BE)

(73) Assignee: Flooring Industries Limited, SARL, Bertrange (LU)

( * ) Notice: Subject to any disclaimer, the term of this patent is extended or adjusted under 35 U.S.C. 154(b) by 0 days.

(21) Appl. No.: 13/810,045

(22) PCT Filed: Apr. 8, 2011

(86) PCT No.: PCT/IB2011/051523
§ 371 (c)(1),
(2), (4) Date: Jan. 14, 2013

(87) PCT Pub. No.: WO2012/007851
PCT Pub. Date: Jan. 19, 2012

(65) Prior Publication Data
US 2013/0111837 A1    May 9, 2013

Related U.S. Application Data

(60) Provisional application No. 61/432,021, filed on Jan. 12, 2011.

(30) Foreign Application Priority Data

Jul. 15, 2010  (BE) .................. 2010/0441

(51) Int. Cl.
*E04B 2/00* (2006.01)
*E04C 2/20* (2006.01)
*E04F 15/02* (2006.01)
*E04B 5/00* (2006.01)
*E04F 13/08* (2006.01)

(52) U.S. Cl.
CPC ............ *E04B 5/00* (2013.01); *E04F 2201/0588* (2013.01); *E04C 2/20* (2013.01); *E04F 2201/0115* (2013.01); *E04F 15/02038* (2013.01); *E04F 2201/0535* (2013.01); *E04F 13/0894* (2013.01); *E04F 2201/0523* (2013.01); *E04F 2201/0146* (2013.01); *E04F 2201/0176* (2013.01)
USPC ........ 52/582.2; 52/588.1; 52/589.1; 52/592.1

(58) Field of Classification Search
CPC ..... E04F 15/02038; E04F 15/02; E04F 15/04; E04F 2201/0153; E04F 2201/0115; E04F 2201/05
USPC ............ 52/588.1, 582.1, 582.2, 589.1, 591.1, 52/592.1, 309.1
See application file for complete search history.

(56) References Cited

U.S. PATENT DOCUMENTS

| | | |
|---|---|---|
| 2004/0068954 A1 | 4/2004 | Martensson |
| 2004/0250914 A1 | 12/2004 | Olofsson |
| 2005/0016107 A1 | 1/2005 | Rosenthal et al. |
| 2007/0151189 A1* | 7/2007 | Yang ............... 52/582.2 |
| 2008/0295438 A1* | 12/2008 | Knauseder ........... 52/589.1 |
| 2009/0151290 A1 | 6/2009 | Liu |
| 2009/0217615 A1* | 9/2009 | Engstrom ........... 52/588.1 |
| 2009/0260313 A1* | 10/2009 | Segaert ........... 52/592.1 |
| 2011/0271632 A1* | 11/2011 | Cappelle et al. ....... 52/582.2 |

FOREIGN PATENT DOCUMENTS

| | | |
|---|---|---|
| DE | 20 2009 004 530 U1 | 4/2009 |
| EP | 0 974 713 A1 | 1/2000 |
| EP | 1 624 130 A2 | 6/2005 |
| EP | 2 063 044 A1 | 5/2009 |
| WO | 97/47834 A1 | 12/1997 |
| WO | 00/47841 A1 | 8/2000 |
| WO | 03/083234 A1 | 10/2003 |
| WO | 2006/032378 A1 | 3/2006 |
| WO | 2007/141605 A2 | 12/2007 |
| WO | 2008-078181 A1 | 7/2008 |
| WO | 2009/066153 A2 | 5/2009 |

OTHER PUBLICATIONS

International Search Report and Written Opinion issued in PCT/IB2011/051523, Sep. 24, 2012.
Belgian Search Report issued in BE 2010/00441, Feb. 25, 2011.

\* cited by examiner

Primary Examiner — Brian Glessner
Assistant Examiner — Brian D Mattei
(74) *Attorney, Agent, or Firm* — Workman Nydegger

(57) ABSTRACT

A floor covering formed by a plurality of panels each having two opposite edges arranged to couple adjacent panels to each other. The coupling parts include a tongue and a groove, as well as locking parts preventing the drifting apart of two such adjacent panels. A separately manufactured insert is provided between at least two of the coupled panels, and the tongue and groove. The insert comprises at least two portions functioning as fixed spacing elements with a first portion between the upper side of the tongue and the lower side of the upper lip, and a second portion between the locking parts.

16 Claims, 12 Drawing Sheets

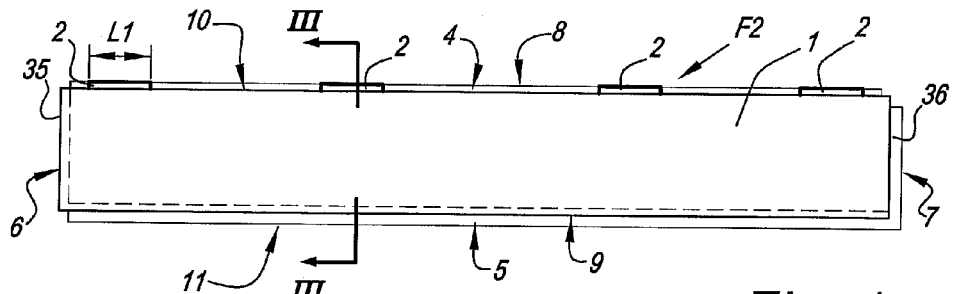
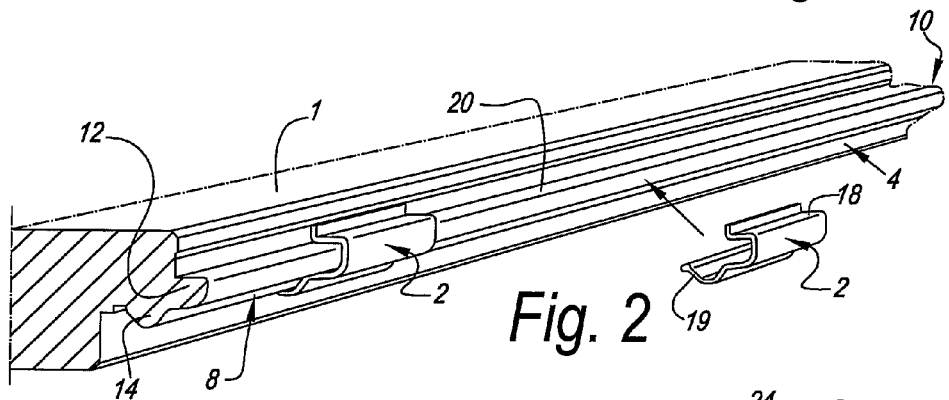
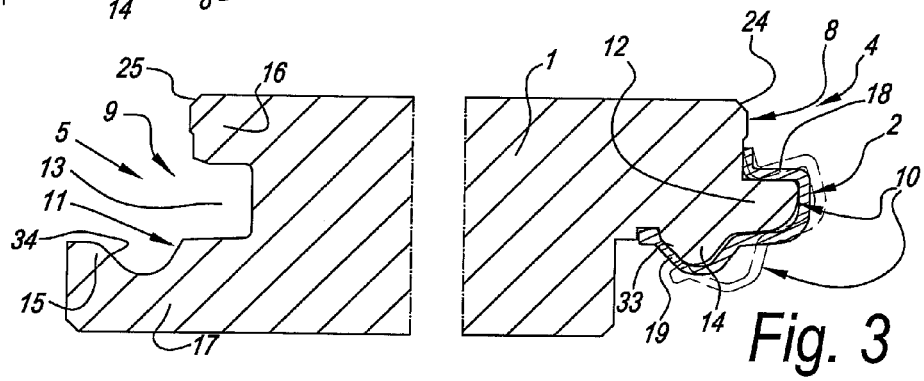
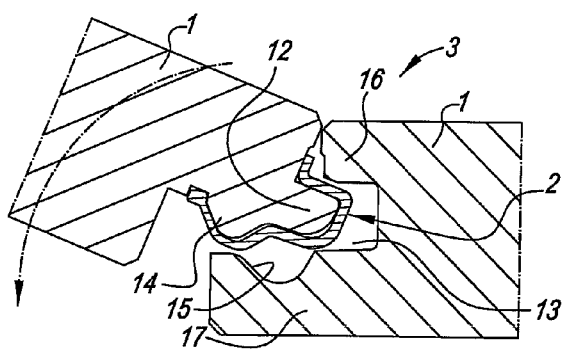

COVERING, AS WELL AS PANELS AND AUXILIARY PIECES USED THEREWITH

This application claims the benefit under 35 U.S.C. 119(e) to the U.S. provisional application No. 61/432,021 filed on Jan. 12, 2011.

BACKGROUND

1. Field of the Disclosure

This invention relates to a covering, as well as panels and auxiliary pieces, which are used therewith.

In particular, the invention is intended for floor coverings, which are composed of floor panels mechanically coupled together in a locking manner; however, more generally it can also be applied with coverings for other purposes, such as wall and ceiling coverings, which are composed of panels.

2. Related Art

More particularly, the invention relates to a covering, which comprises a plurality of panels of a panel material; wherein these panels, at least at two opposite edges, are provided with coupling parts by which the panels are coupled to each other; wherein these coupling parts comprise a tongue and a groove, as well as locking parts preventing the drifting apart of two such panels; wherein the groove is bordered by an upper lip and a lower lip; wherein the upper lip, the lower lip and the tongue are formed at least partially and preferably entirely from the aforementioned panel material; and wherein in the coupled condition the tongue, at least with the portion thereof which consists of the panel material, reaches underneath that portion of the upper lip which also consists of panel material. A covering, more particularly a floor covering of this type, is known, amongst others, from the patent document WO 97/47834.

Such coverings show the disadvantage that, in particular in the case of panels where the panel material is wood or is based on wood, and in particular with floor panels, too, creaking may occur by tiny mutual movements of the panels. In particular with floor panels, the risk is high that creaking noises will manifest themselves, as, when the panels are walked on, they are pressed somewhat into the mostly soft underlying layer underneath the panels and the panels thereby perform a very small hinging movement in the coupling parts, whereby, amongst others, the surfaces of the locking parts shift along each other, which can be accompanied by creaking noises.

A solution for this problem had already been suggested in EP 0 974 713, wherein a lubricating agent, such as, for example, paraffin, or an elastic coating is provided on the coupling parts. A disadvantage of such lubricating agent, however, is that it must be applied relatively accurate, that it is not always efficient, as mostly, it cannot be applied next to the edge of the decorative surface of the panel, and that the mechanical application thereof requires accurate and expensive equipment.

SUMMARY

The present invention aims at an alternative, whereby a system, which is advantageous in many respects, for coupling panels to each other is obtained and whereby, amongst others, the disadvantage of creaking noises can be minimized, whereas one or more disadvantages of the technique described in EP 0 974 713 are excluded.

To this aim, the invention according to a first aspect relates to a covering, which comprises a plurality of panels of a panel material; wherein these panels, at least at two opposite edges, are provided with coupling parts by which the panels are coupled to each other; wherein these coupling parts comprise a tongue and a groove, as well as locking parts preventing the drifting apart of two such panels; wherein the groove is bordered by an upper lip and a lower lip; wherein the upper lip, the lower lip and the tongue are formed at least partially and preferably entirely from the aforementioned panel material; and wherein in the coupled condition the tongue, at least with the portion thereof which consists of the panel material, reaches underneath that portion of the upper lip which also consists of panel material; characterized in that between at least two of the coupled panels, between the aforementioned coupling parts, more particularly between the aforementioned tongue and groove, at least one separately manufactured insert is present, which insert comprises at least two portions functioning as fixed spacing elements, a first portion between the upper side of the tongue and the lower side of the upper lip, and a second portion between the aforementioned locking parts, respectively.

It is noted that by "fixed spacing elements", parts have to be understood which, in the final condition, are present between the adjoining sides of the coupling parts in a stable manner, and which, for example, do not comprise any portions which can be folded away laterally, as this is the case in fact with the inserts known from FIG. 2b of document WO 00/47841 or of the corresponding thereto US 2004/0068954 and FIG. 15 of DE 20 2009 004 530 U1. Such inserts with portions which can be folded away, for example, in order to allow a snap movement with a push-lock coupling, have the disadvantage that a relatively large movability is possible, which herein, however, is tried to be avoided.

However, this does not exclude that those portions of the inserts of the invention, which are performed as fixed spacing elements, can be somewhat elastically compressible or can be provided with a profiled, for example, corrugated surface.

Further, it is noted that by a "panel material", the actual material is meant from which the panel is made. In solid wooden planks, this simply is the wood. In laminate panels, this often may be MDF or HDF. Also, the panel material as such can be composed of a plurality of materials, for example, in so-called "engineered wood" panels.

By making use of one or more separately manufactured inserts, the advantage is obtained that at the location of such insert an element, which is clearly defined in respect to shape, is inserted between the elements, which results in that one can always be sure that such insert is present in a purposeful manner. Another advantage is that it is easily applicable, for example, manually. Thus, high-tech and/or difficult to adjust machinery for applying and dosing lubricating agent are redundant.

However, the above does not exclude that the inserts can also be applied by machine, over the tongue or in the groove.

It is clear that the invention is particularly beneficial with floor panels which are attached to each other for forming a floor covering, as creaking noises may occur in particular in floor coverings, as a result of the forces exerted thereon when the floor coverings are walked on.

It is also clear that the invention will show its advantages in particular with panels where the panel material consists of solid wood, in other words, with solid wooden planks, in particular floor planks. In fact, solid wood is strongly subjected to tensions and deformations, and therefore a purposeful solution against creaking noises is advised.

According to a preferred embodiment, the covering is characterized in that said insert, as well as the profiles with which the aforementioned edges are realized, provide for that at the edges concerned, seen in cross-section, there is no direct contact between the actual panels. Due to the fact that there is no contact, creaking noises as a result of contact between the actual panels are completely excluded.

According to still another preferred characteristic, whether or not in combination with the herein last-mentioned characteristic, a visible gap will be present at least in the proximity of the aforementioned edges of the panels, such by the intermediary of the insert. Due to the insert, such gap can be realized in a smooth manner. Hereby, in this manner a technical solution is offered for imitating old floors having gaps between the panels, whereas still a good coupling is guaranteed. Possibly, the gap can be combined with the application of chamfers, whereby acute edges at the entrance of the gap are avoided.

It is noted that the creation of such gap by means of an insert is also useful for creating, for example, a visual distance between the panels in wall and ceiling coverings, also for applications where the problem of creaking noises is not present.

According to a particular embodiment, in the case that such gap is applied, means will be provided which hide the inserts from view when someone looks into the gap.

These means can be of different kind. According to a first possibility, overlapping parts are applied, which prevent that the inserts can be observed via the gap. According to a second possibility, the inserts can be made in a color which is chosen such that they will be unobtrusive.

According to a particular embodiment, such gap is applied in combination with an insert, the fixed parts of which, as aforementioned, are somewhat elastically compressible. This allows compensating expansion in the panels. For example, in the case of a floor covering, it is a regular occurrence that it cannot expand or expand only with difficulties, for example, when the covering rests against the walls at two opposite edges or is weighed down by heavy furniture. By now making use of somewhat compressible inserts, the individual panels can expand slightly, wherein the expansion then is taken up in the gap in that the aforementioned portions are compressed further, whereby the gap will narrow.

Preferably, such insert is made as a wrapping or sock for the tongue, wherein the insert then, over the majority of its cross-section, adjoins closely or relatively close to the profiled edge part, more particularly rests against the tongue over this majority of the cross-section or is no further than 1 mm removed therefrom. This has the advantage that a faulty assembly is rendered almost impossible.

Preferably, such auxiliary piece or insert is substantially or entirely made single-walled. On the one hand, this offers the advantage that it is relatively stable and can deform little or not at all when supporting and/or tensioning forces are exerted crosswise on the wall thereof, whereas, on the other hand, the thickness thereof remains limited and it can be smoothly provided between the coupling parts. Also, this insert, for simplicity's sake, preferably has a uniform wall thickness, although this is not strictly necessary. By possibly applying different wall thicknesses, in fact special properties can be created. For example, then thickened parts can be integrated, which provide for extra elasticity, for example, for elastically compensating expansion in the panels or for forming an elastically deformable locking part.

In a practical embodiment, the insert, viewed in cross-section, and in the mounted condition, is formed at least of a portion, which in height extends above the tongue, a portion extending substantially parallel to the plane of the panels along the upper side of the tongue, a portion extending around the tip of the tongue, and a portion extending underneath the locking part provided at the tongue. In this manner, so to speak, an encasing of the entire tongue construction is obtained, such that the insert can be smoothly positioned on the tongue or smoothly provided in the groove.

The inserts can be provided in the longitudinal direction locally and at a distance from each other, or continuously over the major part of the length of an edge of a panel. In the first case, the inserts have a short length in relation to the respective length of the edge of the panels, with the advantage that the costs of the inserts will remain limited. In the second case, the coupled panels will be better supported in mutual respect over their entire length, however, the costs for the material for the inserts will rise.

In the case of oblong panels, the inserts preferably are present at least on the long sides.

Preferably, the inserts are configured such that they can be fixedly snapped over or in the respective edge portion. This allows an assembly on the actual panels, without necessitating additional attachment means, such as glue or the like. Herein, possibly an insert can be applied which, in its free condition, is situated in a somewhat deformed condition in comparison with the condition in which it is after mounting, in such a manner that the insert after mounting comes to sit in an elastically tensioned condition over or in the edge concerned. When this is an insert which is intended for being applied over a tongue, this thus originally will be somewhat pressed closed, such that in mounted condition, it will be fitted around the tongue in a somewhat elastically pushed-open condition and will be tensioned around the tongue.

Attachments in other manners, however, are not excluded, whether or not by means of glue.

Preferably, the panels fit into each other with a pretension at least at the edges where the inserts are present, wherein the pretension provides for that the panels are forced towards each other. By means of the pretension, it is avoided that the panels will be sitting loosely in each other and that undesired deformations will manifest themselves in the floor covering.

It is clear that in the case where the panels fit into each other with a pretension, a play between the coupled panels is excluded. Even when the known as such "pretension principle" is not applied, it is still preferred that the whole is constructed such that, in the coupled condition of two such panels, no or almost no play will be present.

Further, it is preferred that such insert in mounted condition is clearly sitting free between the profiled parts at one or more locations, such that these locations can function as expansion zones, the advantage of which will become clear from the description below.

The separately manufactured inserts preferably consist of synthetic material, preferably a more or less soft synthetic material, as such materials have good properties for avoiding creaking noises. In the most preferred embodiment, a thermoplastic elastomer (TPE) is applied. The synthetic material also may be fiber-reinforced, for example, by glass fibers, as a consequence of which the inserts practically cannot be torn.

According to a particular embodiment, the insert is configured such that, with the mutual locking of two of these panels, it can effect a snap effect. In this manner, an extra function is given to the insert in an advantageous manner.

Although such insert, seen in cross-section, preferably is manufactured in one piece from the same material, this does not exclude to apply, according to a variant, an insert having, seen in cross-section, two or more portions consisting of materials which, as such, have different features and as such preferably also offer different functionalities. Herein, this may relate, amongst others, to synthetic materials with different properties, wherein these preferably are connected to each other, preferably by means of coextrusion. Such different functionalities may consist in, for example, that a certain portion is intended for keeping the edges of actual panels in a mutually correct and locked position, whereas another portion is intended for supplying a pressing force for a snap effect during the mutual locking of two panels.

According to a particular embodiment, the insert will provide directly or indirectly for a sealing or gluing function, directly via the nature of the material, which, for example, is well adjoining, or indirectly, by providing the insert with a sealing agent, a glue or a reactive product for avoiding or restricting the penetration of water and/or for effecting an adherence of the insert to the edge.

It is clear that when a sealing effect is desired, use shall be made of inserts extending continuously over the respective edge.

In order to provide for a good resistance against moisture or water, it is preferred that the entire top side of such panel is made water-proof or water-repellent, as well as the portion of the lateral edges extending from the top side of the panel downward to the insert.

When a sealing is intended via the inserts, this may be performed on one pair of edges as well as on the other pair, however, in the case of oblong panels, the sealing via the inserts preferably is applied on the long sides, whereas on the short sides, another technique is applied, either a technique providing for a sealing, or a technique which makes the edges waterproof or which provides for that the edges consist of a waterproof material. To this aim, for example, an insertion piece of synthetic material, from which the coupling parts are formed, can be applied on the short edges, for example, such as known from WO 2007/141605.

It is noted that similar sealing techniques for realizing seals on all sides can also be realized in combination with applications according to the third and fourth aspects also described herein below.

An important advantage of the invention consists in that by using inserts according to the invention, also panels which are somewhat deformed, which is a problem in particular with solid wooden panels, still can be smoothly joined together, as such deformations can be partially compensated in between the inserts and/or by slightly impressing the inserts. Another advantage is that for this reason, thinner planks than usual can be used, which means enormous cost savings in respect to the wood. Preferably, the covering according to the invention thus also shows the characteristic that it is a floor covering with panels in the form of solid wooden planks and that the thickness of these panels is less than 15 mm and better is less than 14 mm and still better is in the order of magnitude of 12 mm.

According to another preferred characteristic, the panels, at the aforementioned edges, are provided with coupling parts, which are configured such that the panels can be coupled to each other by means of a turning movement. Such turning movement offers the advantage that the panels can be smoothly joined together, notwithstanding the presence of the inserts. In order to facilitate this, it is preferred that use is made of a groove with a lower lip extending beyond the upper lip, and wherein the locking part of the lower lip is situated in that portion of the lip which is situated beyond the upper lip.

It is noted that at the aforementioned edges, the tongue in mounted condition preferably is sitting underneath the upper lip of the groove in a pronounced manner, and this such that joining together by means of a so-called push-lock action is impossible at these edges.

In the case that oblong panels are used, the aforementioned edges preferably form the long sides. At the short sides then preferably coupling parts are applied which can be brought into each other by means of a downward movement, more particularly by means of the so-called "fold down" technique, which will be explained herein below in more detail. Herein, on the short sides, for example, a "drop-in" coupling without vertical locking can be used, or a "push-lock" coupling with snap effect, or another system, which makes use of displaceable locking elements, which, for example, are of the type activated upon installation of a subsequent row of panels.

It is clear that the invention also relates to panels for realizing a covering according to the first aspect. Thus, it also relates to a panel, which substantially is made of a panel material, wherein this panel, at least at two opposite edges, is provided with coupling parts by which such panels mutually can be coupled to each other; wherein these coupling parts comprise a tongue and a groove, as well as locking parts preventing the drifting apart of two of such coupled panels; wherein the groove is bordered by an upper lip and a lower lip; wherein the upper lip, the lower lip and the tongue are formed at least partially and preferably entirely from the aforementioned panel material; wherein in the coupled condition of two of such panels, the tongue, at least with the portion thereof which consists of the panel material, reaches underneath that portion of the upper lip which also consists of panel material; with the characteristic that it comprises at least one associated, whether or not separately provided, insert, which is intended for being provided between the coupling parts of two such panels; and that the aforementioned coupling parts and the insert are configured such that, in the coupled condition of two such panels, the insert fits between the coupling parts, more particularly between the aforementioned tongue and groove, wherein such insert comprises at least two portions functioning as fixed spacing elements, a first portion between the upper side of the tongue and the lower side of the upper lip, and a second portion between the aforementioned locking parts, respectively.

According to a preferred embodiment, the inserts are pre-mounted on one of the respective edges at the manufacturer's, preferably on the edge comprising the tongue.

According to a first possibility, the inserts are fixedly snapped on the respective edge. According to another possibility, they are glued thereon, whether or not in combination with the fact whether they are still fixedly snapped on the respective edge.

It is clear that such panel as such further may have all properties which, in mounted condition, result in that a covering is obtained having one or more of the aforementioned subfeatures.

It is clear that herein in particular floor panels for forming a floor covering are concerned. More particularly, this relates to floor panels which are made as solid wooden planks, wherein said coupling parts are formed in one piece from the wood, whereas the inserts applied therewith consist of another material, preferably synthetic material. It is noted that the term "panel" thus must be interpreted in a broad manner and is not restricted to an element made of a large board, but also relates to a "plank". Such panel can be manufactured in a variety of dimensions and thicknesses.

Of course, the invention also relates to auxiliary pieces, more particularly inserts, which are specifically intended for realizing a covering as aforementioned.

Such separate inserts preferably are formed by extrusion. Preferably, they are made somewhat supple. The obtained extruded strip then is cut off at desired lengths in order to obtain the inserts concerned.

As aforementioned, the application of the separately manufactured inserts may take place manually as well as by machine. The inserts can be manually pre-mounted on the panels before the latter are packaged, or, according to another possibility, they are manually provided later on by the installing person realizing the covering. According to the invention, application by machine preferably is performed during or immediately after the production of the panels. Herein, the inserts can be supplied from a roll and systematically be cut to length shortly before or during the application process, or can be supplied in a format already cut to length in order to be mounted on the edge concerned. According to a preferred aspect of the invention, the insert herein is elastically deformed by means of a guiding element in order to bring it smoothly in its position, for example, for pressing it over the tongue or for pressing it into the groove, after which, by elastic resiliency, it will automatically be positioned at its location.

In the case that the invention, for the embodiments described herein above as well as herein below, is applied with floor panels, it is particularly suited for floatingly installed floor coverings, as in particular with such embodiments the disadvantage of undesired creaking noises may occur. However, this does not exclude that floor panels according to the present invention also can be connected with the underlying surface by means of nails, screws or the like.

Further, the invention also relates to two deviating embodiments, which also provide for a purposeful coupling between panels, which are also useful for excluding the disadvantage of possible creaking noises, and which herein after are defined as the second and third aspects of the invention.

According to the second aspect, the invention relates to a covering, which comprises a plurality of panels of a panel material; wherein these panels, at least at two opposite edges, are provided with coupling parts by which the panels are coupled to each other; wherein these coupling parts comprise a tongue and a groove, as well as locking parts preventing the drifting apart of two such panels; wherein the groove is bordered by an upper lip and a lower lip; wherein the upper lip, the lower lip and the tongue are formed at least partially and preferably entirely from the aforementioned panel material; and wherein in the coupled condition the tongue, at least with the portion thereof which consists of the panel material, reaches underneath that portion of the upper lip which also consists of panel material; characterized in that on at least one of the coupling parts, a covering layer is provided, which is attached to the edge of the respective panel by hardening; and that the coupling parts and the covering layer are performed such that, viewed in cross-section, there is no contact between the actual panels over the entire contour of the edges. An advantage of the second aspect consists in that by the combination of such covering layer and the fact that this is performed such that there is no contact between the actual panels, a mutual contact among the panel materials definitely is excluded. The covering layer, however, is always present as from the production and, as it is adhered, it cannot come loose when the panels are manipulated.

Preferably, for the covering layer of the second aspect, use is made of hot-melt glue, the advantages of which will become clear from the third aspect described herein below.

According to the third aspect, the invention relates to a covering, which comprises a plurality of panels of a panel material; wherein these panels, at least at two opposite edges, are provided with coupling parts by which the panels are coupled to each other; wherein these coupling parts comprise a tongue and a groove, as well as locking parts preventing the drifting apart of two such panels; wherein the groove is bordered by an upper lip and a lower lip; wherein the upper lip, the lower lip and the tongue are formed at least partially and preferably entirely from the aforementioned panel material; and wherein in the coupled condition the tongue, at least with the portion thereof which consists of the panel material, reaches underneath that portion of the upper lip which also consists of panel material; characterized in that on at least one of the coupling parts, a covering layer is provided, which is attached to the edge of the respective panel by hardening; that this covering layer, at least at a number of locations, functions as a spacing element between the coupled edges; and that the covering layer is formed of hot-melt glue deposited and hardened on the surface of the edge or edges concerned. In this application, hot-melt glue offers the particular advantage that the adherence is very efficient and that drying during application can be performed very fast and in line. Another advantage is that hot-melt glue has good properties in respect to avoiding creaking noises.

It is clear that the invention also relates to panels which are intended for realizing coverings according to the second and third aspects, in other words, which are provided with a covering layer as aforementioned.

Also according to the second and third aspects, in particular floor panels of solid wood are concerned, wherein the coupling parts at the aforementioned edges substantially are made from the wood in one piece.

The aforementioned invention, when being realized, has also led to particular coupling systems for panels, which also form the basis for two broader independent inventive ideas, which herein below are described as the fourth and fifth aspects of the invention.

According to this fourth aspect of the invention, it relates to a panel, which, at least at two opposite edges, is provided with coupling parts, by which such panels mutually can be coupled to each other, such that a locking is obtained according to a direction perpendicular to the plane of the panels, as well as a locking is obtained according to a direction perpendicular to the coupled edges and in the plane of the panels, wherein the locking according to a direction perpendicular to the coupled edges and in the plane of the panels is performed by means of locking parts, which prevent the drifting apart of two of such coupled panels, and that these locking parts make use of a snap system, characterized in that the snap system at least at one of the aforementioned locking parts comprises at least two portions, which mutually are manufactured of materials with different properties. By applying materials with different properties, the advantage is obtained that the snap system can be optimized, for example, as then each portion can be provided with the properties most suitable for this portion.

According to a preferred characteristic of the fourth aspect, the materials both consist of synthetic materials and are made as a whole by means of coextrusion. In a particular embodiment, the aforementioned portions consist of an actual locking part and a more elastic pressing part, which preferably effects on the locking part as a pressing cushion. In this manner, a particularly effective snap system is provided.

According to the fifth aspect of the invention, it relates to a panel, which, at least at two opposite edges, is provided with coupling parts, by which such panels mutually can be coupled to each other, such that a locking is obtained according to a direction perpendicular to the plane of the panels, as well as a locking is obtained according to a direction perpendicular to the coupled edges and in the plane of the panels, wherein the aforementioned coupling parts allow that two such panels at the aforementioned edges can be coupled to each other by means of a downward movement of one panel in respect to the other, more particularly according to the "push-lock" principle of the "fold-down" principle, wherein the locking according to a direction perpendicular to the plane of the panels is performed by means of locking parts which make use of a snap system, characterized in that the snap system at least at one of the aforementioned locking parts comprises at least two portions, which mutually are manufactured of materials with different properties, such by means of coextrusion, wherein these portions consist of an actual locking part and a more elastic pressing part, which preferably effects on the locking part as a pressing cushion. In an embodiment according to this fifth aspect, too, a very effective snap system is obtained, which allows that the panels can be interconnected in a smooth manner and at the same time gives a great certainty that the locking will be performed indeed.

The fourth and fifth aspect are described for panels lying down, however, they are not limited to floor panels and can also be applied for wall panels, ceiling panels or other panels. It is clear that the intended movements and directions then have to be interpreted in a corresponding manner in function of the application.

Further, the invention also relates to a number of further, related independent aspects, as described herein below.

Thus, the invention also relates to a panel, preferably a floor panel, wherein this panel, at least at two opposite edges, is provided with coupling parts, which comprise hook-shaped parts and which allow that two such panels can be coupled to each other by means of a downward movement, wherein these parts comprise locking surfaces, whereas in the coupled condition of two of such panels, one hook-shaped part defines a seat for the other one; with the characteristic that it is provided with an associated, preferably pre-mounted, insert; that this insert comprises at least three parts, which function as spacing elements, to with a first part providing for that there is a gap between the actual panels, at least based on nominal dimensions and still better effectively; a second part at the bottom in the seat, and a third part, which, in the coupled condition, is situated between the locking surfaces. The coupling parts applied therein are particularly advantageous for being employed at the short sides of panels, as a result of which thus also on these sides a solution against creaking noises can be offered in an effective manner. In a preferred embodiment, this panel further is characterized in that the coupling parts are of the push-lock type. According to still another preferred characteristic, the coupling parts comprise a locking part which is integrated into the insert.

Also, according to still another independent aspect, the invention relates to a panel, wherein this panel, at least at two opposite edges, is provided with coupling parts, which comprise hook-shaped parts and which allow that two such panels can be coupled to each other by means of a downward movement of one panel in respect to the other, wherein these parts comprise locking surfaces, whereas in the coupled condition of two of such panels, one hook-shaped part defines a seat for the other one; with the characteristic that it is provided with an associated, preferably pre-mounted, insert and comprises a vertically active locking system with an elastically displaceable locking part, which forms part of the insert, wherein this locking system is realized according to any of the following possibilities:

the locking part is supported towards its back side and the elastic displacement thereof during coupling is generated at least partially and preferably entirely by the elastic compressibility of a part of which the locking part forms part;

at the height of the locking part, different material portions are applied, on the one hand, a first material portion, of which the actual locking part is formed, and a second material portion, which forms a back support for the locking part, wherein the second material portion consists of a material which can be compressed more supple than the material of the first material portion;

the insert comprises a part, which, on the one hand, on one side thereof comprises the locking part and, on the other hand, at the other side thereof, is bendable in its central part in respect to the extremities thereof, more particular can be pressed into a space situated therebehind;

the insert comprises a part, which, on the one hand, on one side thereof comprises the locking part and, on the other hand, at the other side thereof, is bendable in its central part in respect to the extremities thereof, this against the force of a material portion functioning as an elastically compressible matter, which latter material portion is made in one piece, for example, by coextrusion, with the remainder of the insert;

the insert comprises an upwardly directed part, which comprises a locking part directly adjoining thereto, which latter locking part is in the form of a downwardly directed lip, wherein these parts are made in one piece and continuous from one and the same material, with the same material characteristics.

These embodiments of locking systems offer the advantage that constructively, they can be realized easily and at a low cost and allow a smooth connection of panels according to the push-lock principle.

Finally, the invention also relates to methods for manufacturing panels.

More particularly, it relates to a method for manufacturing panels, wherein these panels are provided with strip-shaped insertion pieces, which are made as a spacing insert and/or as an insert with a locking function, with the characteristic that the insertion pieces are formed of a continuously produced strip, however, are supplied to the panels in the form of pre-cut strips from a magazine, such by means of an application device. This method has the advantage that also strip-shaped insertion pieces with a more complex cross-section can be provided smoothly at the panels, which pieces, when they would be drawn off directly from a roll, often would be difficult to present to the panels in a correct manner. By forming strips of a certain length beforehand, these are easy to handle.

Independently therefrom, it also relates to a method for manufacturing panels, wherein these panels are provided with strip-shaped insertion pieces, which are made as a spacing insert and/or as an insert with a locking function, with the characteristic that the insertion pieces are formed of a continuously produced strip, however, are supplied to the panels in the form of pre-cut strips from a magazine, which in their turn, by means of a dividing device, are cut to further smaller strips, which then form the actual insertion pieces and are provided on the panels by means of an application device. This method also shows the aforementioned advantage. Further, also the advantage is obtained that the larger strips remain smooth to handle, whereas the smaller strips then are formed only when being applied.

It is clear that these methods can be employed when applying a variety of strip-shaped insertion pieces, which are made as a spacing insert and/or as an insert with a locking function, and thus are not limited to the application of the embodiments of inserts described herein below by means of the figures.

It is clear that all aspects can be combined at choice, inasmuch as they do not show any contradictory characteristics.

Further characteristics of the invention will become clear from the following detailed description and the claims.

BRIEF DESCRIPTION OF THE DRAWINGS

With the intention of better showing the characteristics of the invention, hereafter, as an example without any limitative character, several preferred embodiments are described, with reference to the accompanying drawings, wherein:

FIG. 1 in top plan view represents a panel, in this case a floor panel, according to the invention;

FIG. 2 in perspective represents a view according to arrow F2 in FIG. 1;

FIG. 3 at a larger scale represents a cross-section according to line III-III in FIG. 1;

FIG. 4 represents how two panels from FIG. 3 can be coupled to each other;

DETAILED DESCRIPTION OF VARIOUS EMBODIMENTS

Figure 5:
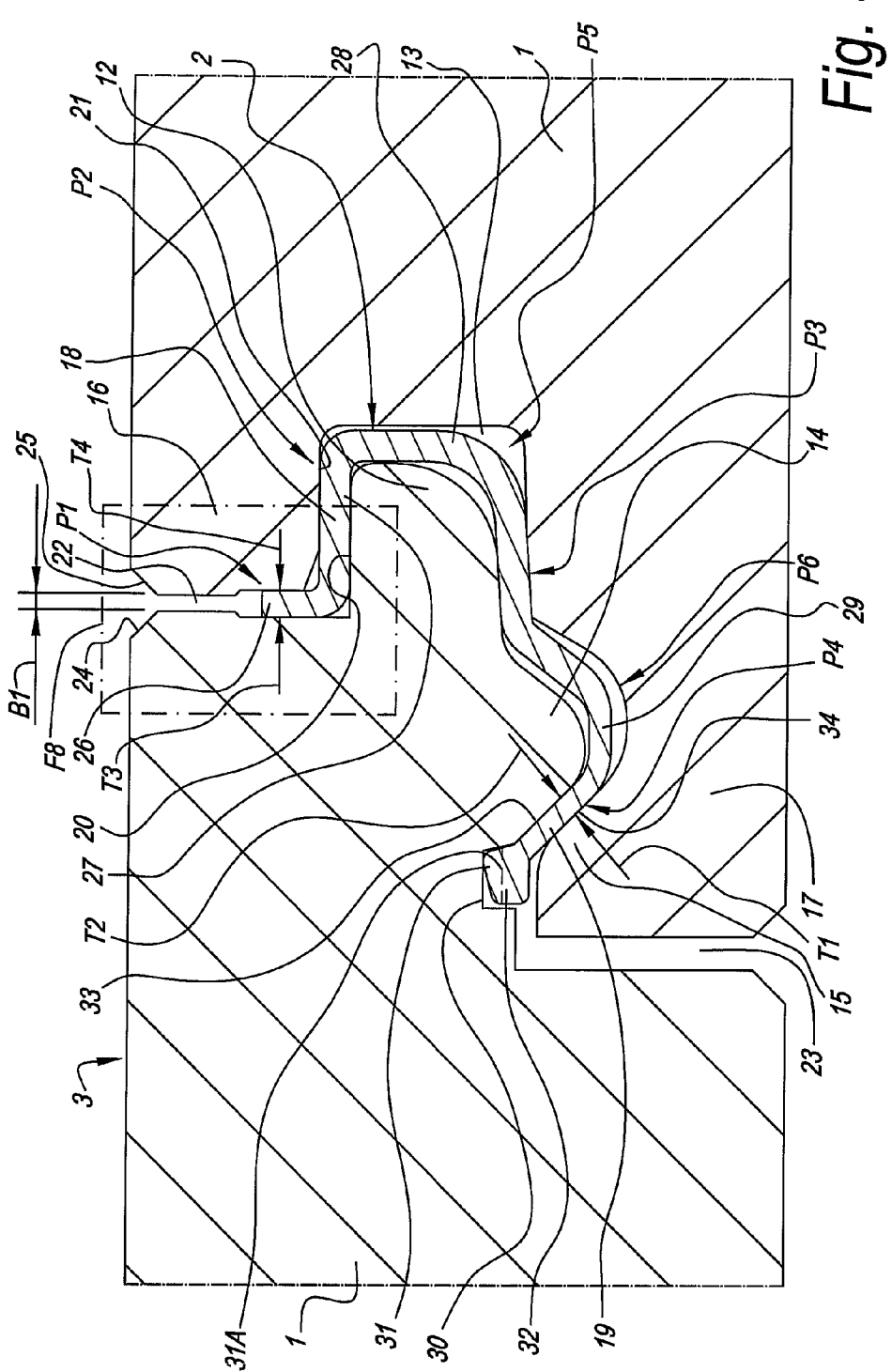
FIG. 5 represents the panels from FIG. 4 in coupled condition.
Figure 6:
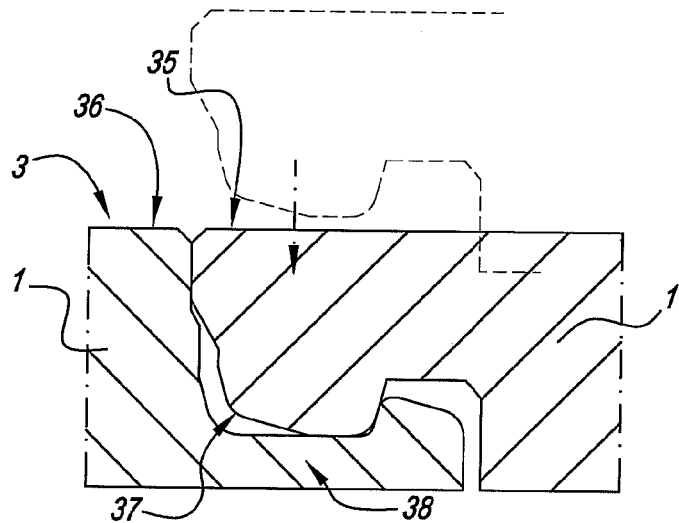
FIG. 6 in cross-section represents an embodiment of coupling parts, which can be applied on short sides of such panels.

In FIGS. 1 to 3, a panel 1, more particularly a floor panel, according to the invention is represented, as well as a number of auxiliary pieces applied therewith, in the form of inserts 2, in such a manner that, as described in detail herein below, a floor covering 3 can be formed therewith, as illustrated in FIGS. 4 to 6.

In the represented example, the panels as such consist of solid wood, which latter thus also forms the panel material. In the example, the panels are made as oblong wooden planks, with long sides 4-5 and short sides 6-7.

The panels 1, at least at two opposite edges 8-9, in this case the edges forming the long sides 4-5, are provided with coupling parts 10-11, by which the panels 1 can be coupled to each other. These coupling parts 10-11 comprise a tongue 12 and a groove 13, as well as locking parts 14-15 preventing the drifting apart of two such panels 1. The groove 13 is bordered by an upper lip 16 and a lower lip 17, wherein the upper lip 16, the lower lip 17 and the tongue 12 in this represented example are formed entirely from the aforementioned panel material. As can be seen in FIG. 5, the tongue 12, in the coupled condition, at least with the portion thereof which consists of the panel material, reaches underneath that portion of the upper lip 16 which also consists of panel material.

The particularity of the invention consists in that between at least two of the coupled panels 1, between the aforementioned coupling parts 10-11, more particularly between the aforementioned tongue 12 and groove 13, at least one separately manufactured auxiliary piece as aforementioned, in particular an insert 2, is present, which insert comprises at least two portions 18-19 functioning as fixed spacing elements, a first portion 18 between the upper side 20 of the tongue 12 and the lower side 21 of the upper lip 16, and a second portion 19 between the aforementioned locking parts 14-15, respectively. As becomes clear from FIGS. 1 and 2, practically seen a plurality of such auxiliary pieces or inserts 2 are applied along the edge of a panel concerned.

In the example of FIGS. 1 and 2, the inserts 2, in relation to the respective edge length of the panels 1, have a short length L1 and, as a result, are present along the respective edges on local locations only and thus with interspaces in respect to each other. Herein, the auxiliary pieces, in other words, the inserts 2, do not all have to be of the same length. It is clear that instead of a plurality of inserts on one edge, thus, in longitudinal direction at a distance from each other, also only one insert can be applied, which then preferably extends over the entire length or almost entire length of the edge concerned.

In the embodiment of FIG. 5, the insert 2, as well as the profiles with which the aforementioned edges 8-9 are made, are configured such that, in the coupled condition, at the edges 8-9 concerned, viewed in cross-section, there is no direct contact between the actual panels 1, in other words, that at the coupled edges 8-9 there is no direct contact between the panel materials of the one and the other panel 1. In the example, this is obtained, on the one hand, by the presence of the inserts 2 which function as spacing elements, and, on the other hand, an appropriate profile of the edges 8-9. There, where the inserts 2 are situated, actually no direct contact is possible. The profiled parts of the edges 8-9 preferably are straight-lined, such that, seen in longitudinal direction, also the same distance is preserved over the interspaces between the successive inserts 2 and consequently there is no contact. Further, the profiles are such that, at least in the example, seen according to the contour of the edges in cross-section, openings, more particularly gaps 22-23, are preserved above and underneath the inserts 2.

In the embodiments wherein a gap is desired on the upper side, it preferably shows a restricted width B1, however, preferably is visible to the naked eye. Practically seen, this width is 0.05 to 0.2 mm, however, smaller or larger widths are not excluded, either. It is clear that a very good visibility and noticeability of the gap to the naked eye will occur at the upper limit of said range only, as well as with larger values.

It is noted that in the example of FIG. 5, for clarity's sake a gap is represented which is relatively wide in respect to the remaining dimensions of the panel.

Further, it is preferred that at the upper sides of the edges 8-9, chamfers 24-25 are formed, too.

As represented in the figures, the inserts 2 are performed, so to speak, as a wrapping or sock, which wrapping or which sock extends locally over the tongue 12 and/or is locally present in the groove 13.

The represented embodiment of FIGS. 1 to 5 also shows that such insert 2 preferably is single-walled. Further, it is preferred that, as represented, the insert 2, seen in cross-section, in mounted condition is at least formed by a portion 26 extending in height above the tongue, a portion 27 extending substantially parallel to the plane of the panels along the upper side of the tongue, a portion 28 extending around the tip of the tongue, and a portion 29 extending underneath the locking part 14 provided at the tongue. Depending on the form of the coupling parts, however, other forms are possible, of course.

As is represented in dashed line in FIG. 3, the inserts 2 are configured such that they can be fixedly snapped over the tongue 12. Alternatively, such insert 2 also can be fixedly snapped in the groove 13.

It is noted that it is preferred that the panels 1, at least at the edges 8-9 where the inserts 2 are present, fit into each other with a pretension, by which the panels are forced towards each other. This is illustrated schematically in FIG. 5 by means of the indicated tension forces T1-T2-T3-T4. By performing suitable minor overlaps in the design, tension forces T1-T2 at the height of the locking parts 14-15 may be obtained, which provide for that the panels 1 also are forced together at the top, as a result of which, as indicated by the tension forces T3 and T4, they press against each other at the top by the intermediary of the portion 18. The tension forces can be created in any manner, for example, by a bending in the coupling parts or by elastic compression in the materials of the panels and/or of the insert 2, or also by a combination of these possibilities.

It is also noted that such insert 2 in mounted condition, such as represented, preferably at a number of locations P1-P2-P3-P4 is performed closely adjoining or rather closely adjoining to the profiled parts, however, at a certain number of locations P5-P6 also is clearly sitting freely between the profiled parts. The last-mentioned locations P5-P6 then will function as expansion zones in order to compensate deformations when such insert 2 during the joining of the panels 1 on the closely adjoining locations P1-P2-P3-P4 is pressed on its place, and/or in order to compensate deformations as a result of tolerance differences.

At the edge 8 comprising the tongue 12, as represented preferably a stop 30 is formed, which can cooperate with the lower end edge 31 of the inserts 2, which prevents that the inserts 2, when the panels 1 are connected, are pressed away in downward direction and/or would move downward by creepage.

As indicated by dashed line 31A in FIG. 5, the lower edge of the insert 2 may end explicitly at a distance below the thereabove-situated material of the panel concerned, such that usually there will be a small space there above. This allows that, when the insert settles during connecting two panels, the free extremity 31A can move upward, by which it is excluded that such settling can exert a disadvantageous influence on the locking.

As represented, such insert 2 can comprise a lip 32, which facilitates the application thereof on a panel 1, at least when the inserts 2 are provided manually. The lip 32 then forms a stop against which pressure can be exerted with a finger in order to press a loose insert 2 over the tongue 12 and the associated locking part 14.

As aforementioned, the inserts 2 preferably consist of synthetic material, preferably a thermoplastic elastomer (TPE).

In the represented example of FIGS. 1 to 5, the panels 1 are provided at the edges 8-9 with coupling parts 10-11, which are configured such that the panels 1 can be coupled to each other by means of a turning movement, such as illustrated in FIG. 4. As represented, it is preferred that the groove 13 herein is bordered by a lower lip 17 extending to beyond the upper lip 16, wherein the locking surfaces 33-34 formed a the locking parts 14-15 are situated at the height of the portion of the lower lip 17 which extends beyond the upper lip 16.

The panels 1 described above by means of FIGS. 1 to 5 can be provided at the edges 35-36 of the short sides 6-7 with in principle any type of coupling parts or may even be free from coupling parts. Preferably, however, the panels 1 shall be of the "fold-down type", which means that a panel is coupled with its edge 8 by means of a downward turning movement to the edges 9 of a preceding row of panels and that simultaneously with this downward turning movement, an engagement is realized between a short side of this panel and the short side of a panel already installed in the same row. In FIG. 6, a possible embodiment is represented, wherein the coupling parts 37-38 formed at the edges 35-36 consist of engaging behind each other hook-shaped parts, which, in the coupled condition, exclusively provide for a locking in the plane of the panels 1, however, do not provide for a locking perpendicular to the plane of the panels. Systems making use of such coupling parts 37-38 are also called "drop-in" systems.

Figure 7:
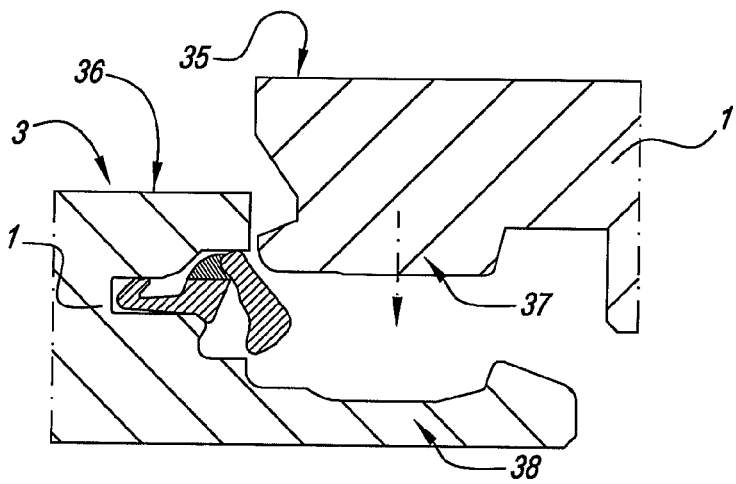
FIG. 7 represents a variant of the embodiment of FIG. 6.

FIG. 7 represents a variant of the short sides, wherein use is made of a so-called push-lock system, in this case according to an embodiment which is known from document WO 2009/066153, wherein then in the coupled condition, apart from a locking against the drifting apart of the panels 1, also a locking perpendicular to the plane of the panels 1 is obtained. Of course, other coupling parts of the push-lock type are possible, too.

Figure 8:
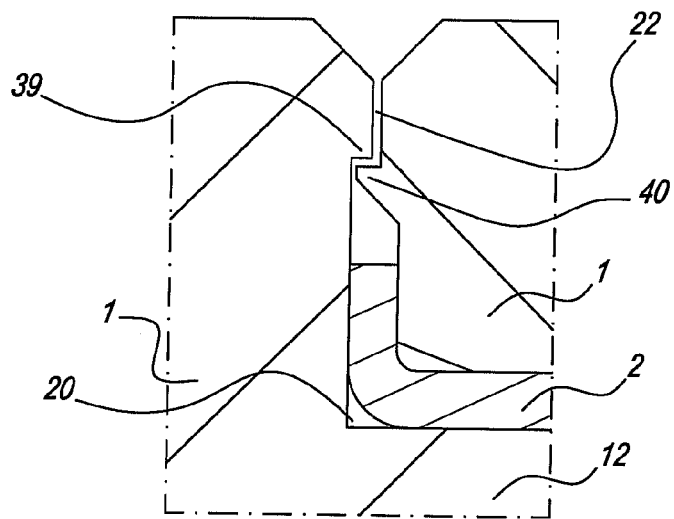
FIG. 8 at a larger scale represents a view of the portion indicated by F8 in FIG. 5, however, for a variant.

In FIG. 8, a variant is represented, which comprises means in the form of overlapping parts 39-40, which prevent that the inserts 2 are visibly observable through the gap 22. According to a variant, such means also can consist in that the inserts, in respect to color or tint, are adapted to the color or tint of the upper side 20 of the tongue 12, whereby they practically are not apparent when one looks between the gap 22.

Figure 9:
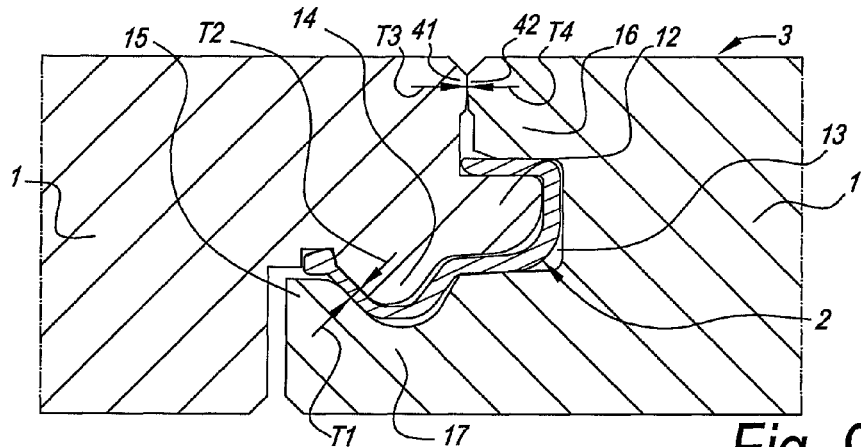
FIGS. 9, 10 and 11 represent three variants of coupled panels according to the invention, according to a view similar to that of FIG. 5.

In FIG. 9, a variant of the embodiment of FIG. 5 is represented, wherein no gap 22 is present and the panels 1 on top have directly contacting parts 41-42. The insert 2 applied in this case does not comprise a portion 25 functioning as a spacing element. It is clear that the coupling parts in this case, too, can be designed such that the panels fit into each other with a pretension, wherein said portions 41-42 then are forced towards each other with a tension force T3, T4, respectively. This does not exclude that also embodiments are possible which fit into each other without any pretension. In consideration of the fact that the panels 1, when being walked on, rather have the tendency to rotate somewhat around each other, wherein the center of rotation is situated next to the portions 41 and 42, there will be few dislocations between the aforementioned portions 41 and 42 which might cause creaking noises. On the locations where major dislocations are possible indeed, the invention maintains its advantages.

Figure 10:
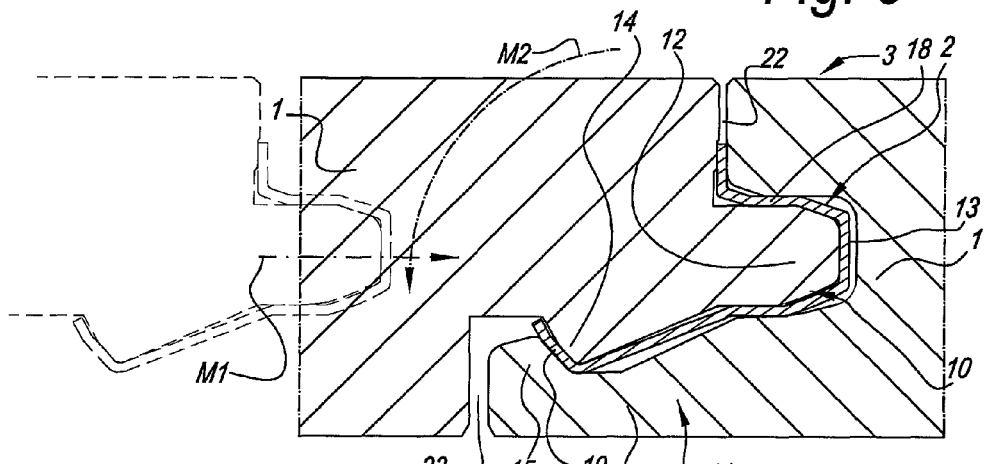

FIG. 10 shows another variant of the embodiment of FIG. 5, wherein the coupling parts 10-11 fit into each other at least by means of a shifting and snap movement M1. Apart therefrom, the represented profile also allows an engagement by means of a turning movement M2. In the represented example, the snap movement M1 is possible as the lower lip 17 is made somewhat thinner and can bend out in downward direction. By an opposed turning movement, coupled panels 1 can be uncoupled again.

Figure 11:
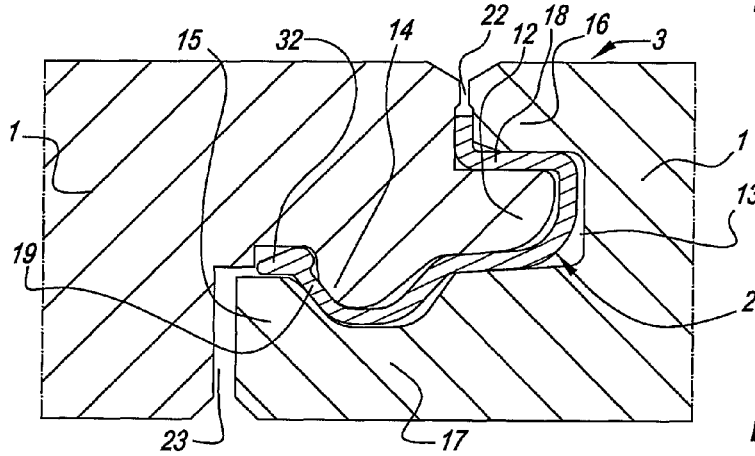

In FIG. 11, a variant of FIG. 5 is represented, wherein the lip 32 is made somewhat more pronounced.

Figure 12:
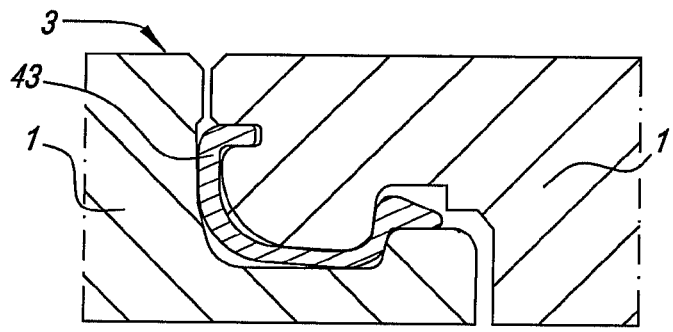
FIG. 12 represents a variant of the embodiment of FIG. 6.

FIG. 12 represents a variant of the embodiment of FIG. 6, which is intended for being applied at the short sides. Here, too, use is made of an auxiliary piece in the form of an insert 43, preferably of synthetic material, too, by which the risk of the occurrence of creaking noises can be minimized. Herein, the whole, as represented, can be designed such that, viewed in cross-section, there is no direct contact between the actual panel material of the coupling 1 along the entire contour, wherein on top then in fact a gap is present between the panels 1. According to a not represented variant, indeed a contact may exist on top, however, for the same reasons as already described by means of FIG. 9, the risk is small that this small contact will produce annoying creaking noises.

Figure 13:
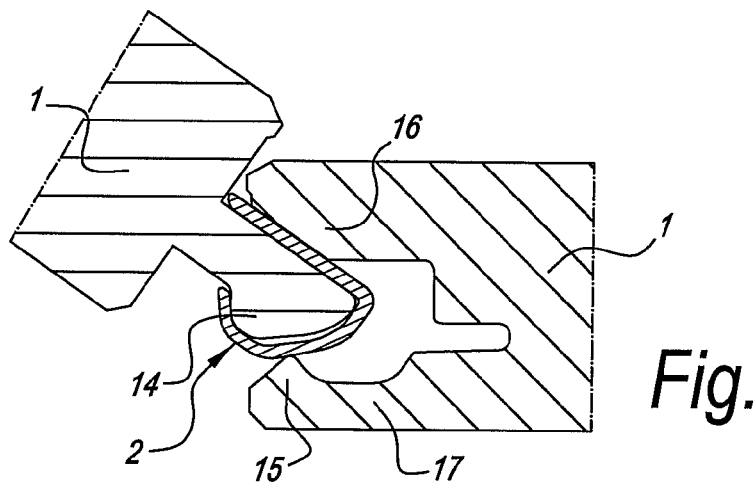
FIG. 13 represents another variant of the invention.

FIG. 13 represents a variant of the embodiment of FIG. 9, with the particularity that the lips 16 and 17 are of the same length or are of almost equal length.

Although it is preferred that at the short sides of the panels 1 coupling parts are applied which allow being engaged by a downward movement, more particularly according to the well-known "fold-down" principle, either by means of coupling parts of the "drop-in" type, or of the "push-lock" type, it is not excluded to apply, according to variants, other coupling parts for the short sides, which coupling parts require another installation technique. For example, at the short sides also coupling parts, coupling profiles, respectively, can be applied of the type wherein the coupling is performed by means of a turning movement along the respective edges and/or by a shifting and snap movement, wherein these coupling parts are or are not equipped with one or more inserts 2 in accordance with the invention. This means, amongst others, that all embodiments represented in FIGS. 5, 9, 10, 11 and 13 can also be applied on the short sides.

Figure 14:
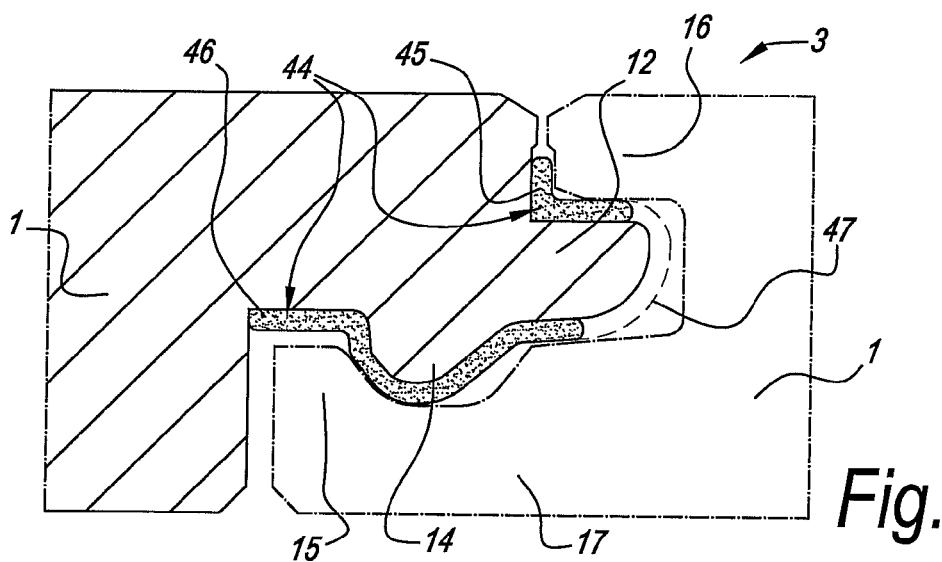
FIG. 14 represents a portion of a floor covering, wherein the second and third aspects of the invention are applied.

FIG. 14 represents an embodiment, which meets the second and third aspects of the invention. Here, a covering layer 44, consisting of a material which is adhered on the panels by hardening, is provided between the panels 1 and functions as an insert. In the represented example, the covering layer 44 consists of two parts 45 and 46, which both are deposited on the surface of the tongue profile. Alternatively, as represented by dashed line 47, this may also be one continuous covering. In accordance with the second aspect of the invention, the coupling parts and the covering layer are made such that there is no contact between the actual panels over the entire contour of the edges. In accordance with the third aspect of the invention, the covering layer 44 consists of hot-melt glue deposited on the respective surfaces and hardened.

It is noted that the covering layer 44 applied according to the second and third aspects can be provided in any manner and does not necessarily have to be a flat layer following the contour.

The material of the covering layer 44, more particularly the hot-melt glue, is deposited on the surface concerned in liquid or viscous condition. This may be performed, for example, by means of one or more application nozzles, which either deposit a wide continuous stream of material on the surface or provide this material on the surface in the form of a pattern, such as a zigzag pattern or dot pattern. Possibly, the thickness thereof can be calibrated by means of a caliber, scraping system or the like.

The term "covering layer" has to be understood in a broad sense and does not necessary have to mean a flat layer. The layer may consist, for example, also of one or more local strips with a round cross-section which extend in the longitudinal direction of the edge.

It is noted that the covering layer preferably also is present at least on the location between the upper side of the tongue and the lower side of the upper lip, as well as on the location between the locking parts, analogous to the aforementioned inserts.

Figure 15:
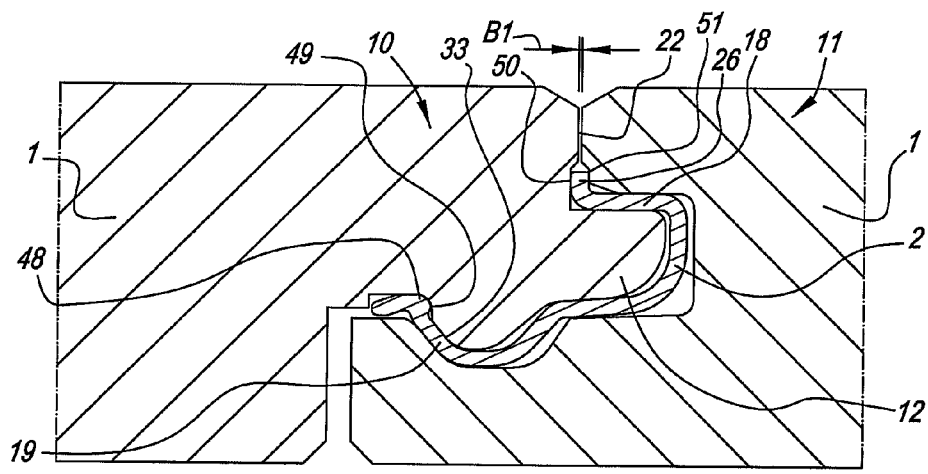
FIG. 15 in cross-section represents another variant of the invention, in a view similar to that of FIG. 5.

In FIG. 15, an embodiment of coupled panels 1 according to the invention is represented, wherein the gap 22 is represented with a small width B1, such in a realistic proportion to the thickness of the panels. This figure makes clear that, when applying a small width B1, it is almost impossible in practice to still perceive the inserts from the outside, with the advantage that these latter cannot effect an annoying effect in the appearance of the covering.

According to a particular embodiment, the profiles of the coupling parts 10 and 11 and the insert 2 are performed with such dimensions that, in the mounted condition, the upside-situated sides of the panels theoretically define a gap 22, however, in fact the manufacturing tolerances are partially overlapping, such that in practice mostly a gap will be present, however, such covering may also comprise panels, or comprise portions of panels, where the gap is closed. In this manner, on the one hand, gaps of small width can be striven for, and, on the other hand, as the possible contact which is present is of minor nature, large horizontal compression forces at the upper edges by direct contact between the panel materials will be avoided. In such case, the possible large forces in horizontal direction then for the major part are transferred via the portion 26, with as a consequence that the risk of the occurrence of creaking noises is reduced.

As also indicated in FIG. 15, the insert 2 can comprise a portion 48, which cooperates with a locking surface 49, behind which the portion 48 is fitted in mounted condition. The locking surface 49 as such does not necessarily have to be flat and may also be curved. Preferably, the locking surface 49 is steeper than the locking surface 33 or at last comprises a portion which is steeper. Also, instead of a locking surface 49, a hollow portion or the like can be applied, wherein at the interior side of the insert 2 then a protruding part is present, which can be fitted in the hollow portion. It is clear that this characteristic in general can be applied with all suitable inserts 2 of the invention. This characteristic is, amongst others, also clearly visible in the embodiment of FIG. 5.

In the embodiment of FIG. 15, as well as in most of the other represented embodiments, the portion 26 in the mounted condition is taken up in recesses 50 and 51, which are present on the respective edges. According to a not represented embodiment, only one recess 50 or 51 can be applied and this recess 50 or 51 can be made so deep that the portion 26 comes to sit in the recess 50 or 51 over its entire thickness, wherein then, for example, on the location where no recess is present, a protrusion is formed, which, in the mounted condition, comes into contact with the portion 26. Instead of making use of such protrusion, a support point in horizontal direction may also be created on another location, for example, between the tip of the tongue and the bottom of the groove, with the insert 2 therebetween.

Figure 16:
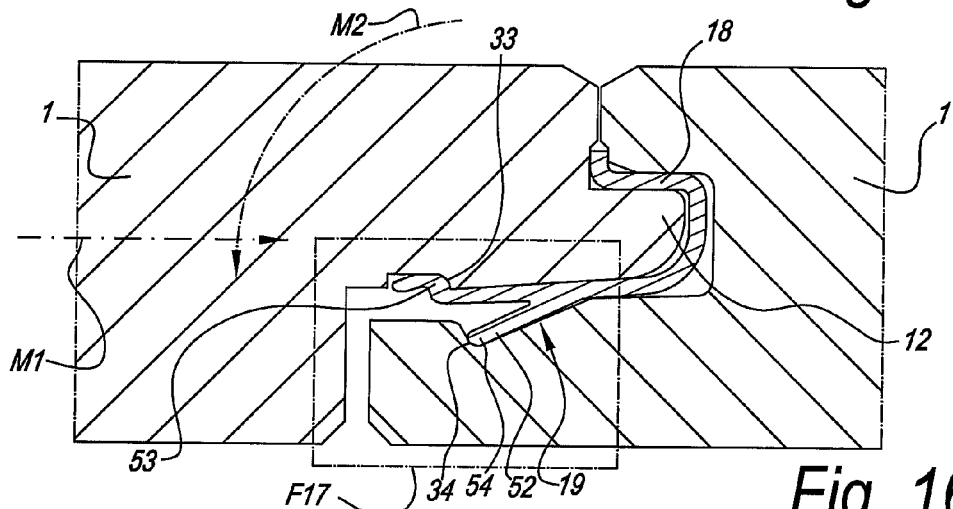
FIG. 16 in cross-section represents another variant.

In FIG. 16, a deviating variant of the invention is represented, wherein the second portion 19, instead of as a fixed spacing element, is realized as a movable spacing element and for this purpose comprises a movable portion 52 allowing to lock two such panels to each other by means of a snap effect. As represented, herein the whole preferably is designed such that the panels 1, by means of a movement M1 in the plane of the panels or substantially in the plane of the panels, can be pushed towards each other and thereby can be fixedly snapped into each other. Herein, the locking surfaces 33 and 34 are not situated directly opposite each other, however, they cooperate with each other by the intermediary of the insert 2. More particularly, the locking surface 33 cooperates with a support portion 53 of the insert 2, whereas the locking surface 34 cooperates with a support portion 54, which is formed by the extremity of the movable portion 52.

In the embodiment according to FIG. 16, it is preferred that the insert is mounted on the tongue at the manufacturer's, either manually or automatically. Joining the represented panels then is performed by shifting the left-hand panel according to arrow M1 towards the right-hand panel. Herein, the left-hand panel is displaced over the lower lip of the right-hand panel. Herein, the movable portion 52 is pushed elastically upward with its free extremity until it springs back behind the locking surface 34, by which the locked condition is effected. It is noted that the panels 1 in the represented embodiment can also be joined together by means of a turning movement M2.

Figure 17:
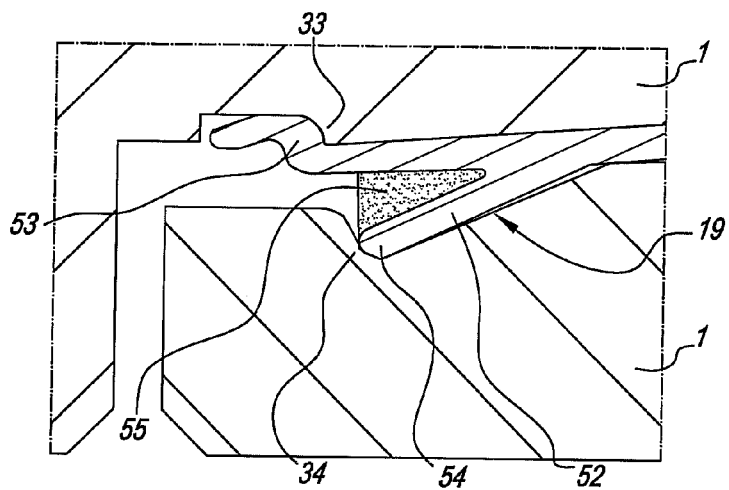
FIG. 17 at a larger scale represents a variant of the portion indicated by F17 in FIG. 16.

FIG. 17 represents a variant, wherein the movable portion 52 is tensioned by means of a pressing portion 55 in the form of a compressible material portion, which cooperates with a side of the movable portion 52. Herein, said pressing portion 55, so to speak, forms an elastically compressible cushion. Preferably, the pressing portion is made in one piece with the insert 2 and preferably is formed by means of coextrusion.

The embodiments of FIGS. 16 and 17 can be applied on one pair as well as on both pairs of sides of panels. In the case of oblong panels, this embodiment in fact is particularly suitable for the short sides, whereas on the long sides then, for example, an embodiment as in FIG. 5 will be applied. Such combination allows that newly to install panels can be coupled at their long sides to a preceding row by means of a turning technique and at their short sides by means of a push and snap technique.

It is clear that FIG. 17 also forms an example of the fourth aspect of the invention.

Figure 18:
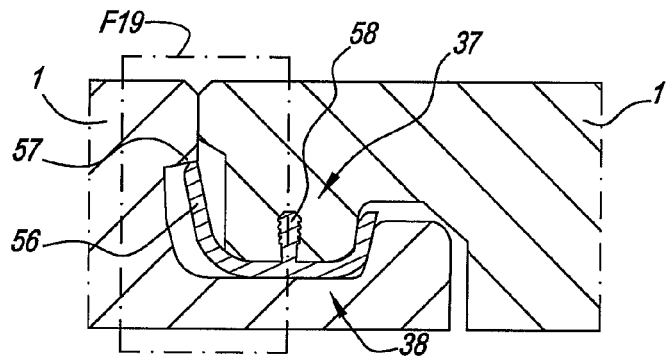
FIG. 18 represents a variant according to a view similar to that of FIG. 12.

In FIG. 18, a variant of FIG. 7 is represented, by which at the second pair of sides, more particularly the short sides, a push-lock coupling can be effected. Herein, use is made of an element in the form of a strip or the like, which is provided at one edge of the panel 1 and consists, for example, of synthetic material, wherein this part comprises an elastically bendable or elastically movable portion 56, which can engage behind an edge 57. The strip-shaped element is attached to the edge concerned, for example, by means of an attachment part 58. It is clear that the panel represented at the right-hand side can be coupled to the one at the left-hand side by means of a downward movement and that therein, the movable portion first is pressed sideways to the right in order to then engage behind the edge 57.

Figure 19:
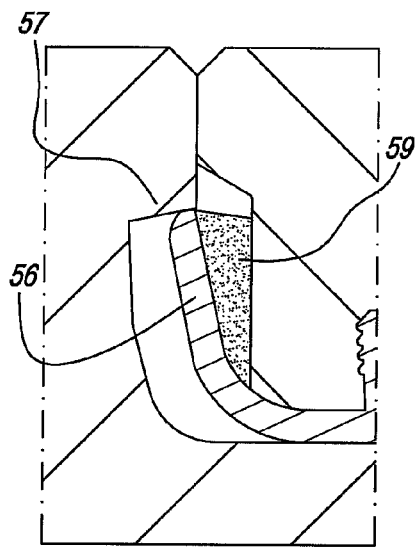
FIG. 19 at a larger scale represents a variant of the portion indicated by F19 in FIG. 18.

FIG. 19 represents a variant, wherein a pressing portion 59 is also present behind the elastically movable portion 56, in the form of a compressible material part, which cooperates with a side of the movable portion 52. Herein, this pressing portion 59, so to speak, forms an elastically compressible cushion. The pressing portion preferably is made in one piece with the strip and preferably is formed together with it by means of coextrusion.

It is clear that FIG. 19 also forms an example of the fifth aspect of the invention.

Figure 20:
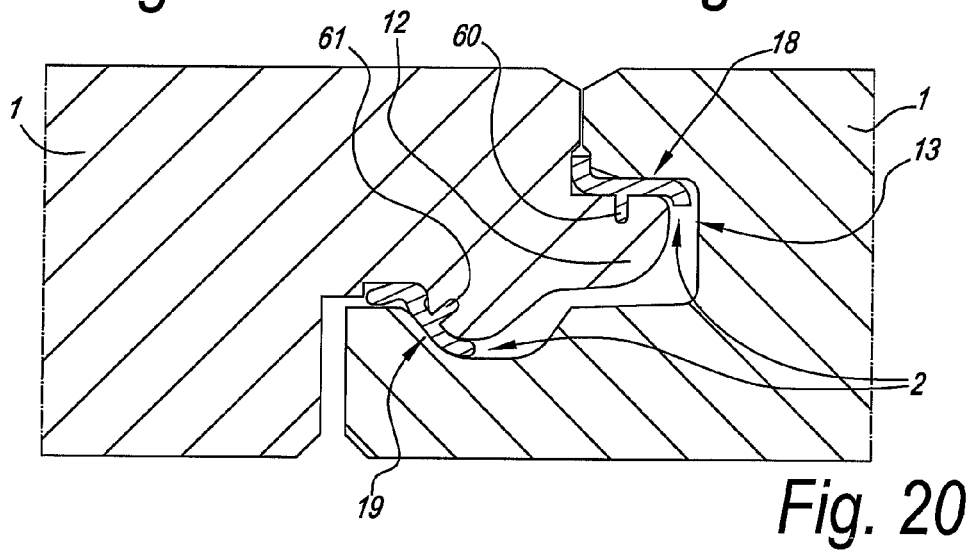
FIG. 20 represents another particular embodiment of the invention.

FIG. 20 represents another variant of FIG. 5, wherein one insert 2 substantially is composed of two separate parts 18 and 19, each formed by prefabricated strips, for example, of synthetic material. In the example, these strips are mounted on the tongue 12 by means of attachment parts 60 and 61 in the form of ribs which are fixedly clamped in recesses. Other manners of attachment are not excluded. Also, according to a not represented variant, such separate parts can be pre-mounted in the groove instead of on the tongue. According to another not represented variant, one part, for example, the part 19, is pre-mounted on the groove, whereas the other part, in this case then the part 18, is mounted on the tongue. It is clear that the designs and locations of the parts 18 and 19 are not limited to those of FIG. 20 and thus also other embodiments of the herein above designed idea are possible. It is also clear that also in the case of an embodiment with two separate parts 18 and 19, these parts can extend continuously in the longitudinal direction of the edge, and can as well consist of a plurality of parts, which mutually are situated at a distance from each other.

It is clear that the invention also relates to methods for realizing such panels. According to one of these methods, first panels are made and, at least on a number of edges, are provided with the necessary profiled parts, after which the respective inserts are provided on the edges concerned. Applying the inserts may be performed after the panels themselves are formed completely, however, before packaging them. According to a variant, however, it is also possible to provide the inserts already during forming of the actual panels, for example, by first milling the long sides, then providing one or more inserts and only then milling the short sides.

Figure 21:
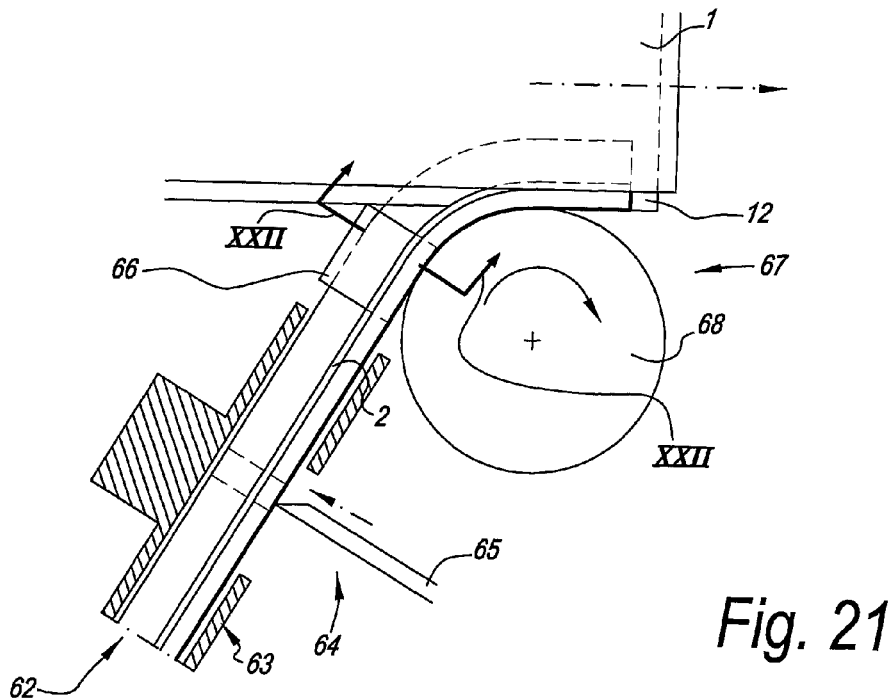
FIG. 21 schematically represents a method according to the invention, which can be applied when manufacturing panels according to the invention.
Figure 22:
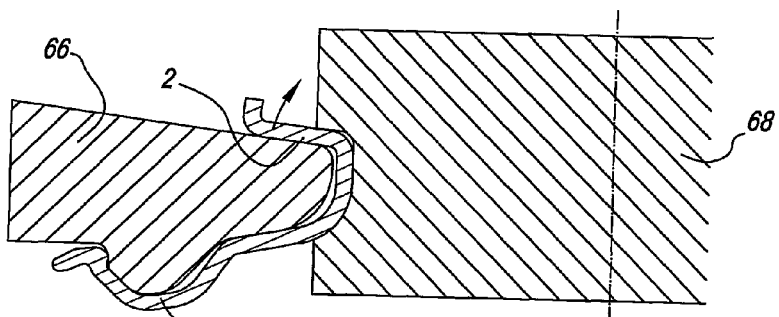
FIG. 22 at a larger scale schematically represents a cross-section according to line XXII-XXII in FIG. 21.

FIGS. 21 and 22 schematically represent an embodiment of a technique which can be applied herein for providing an insert 2 on a tongue 12. Herein, the insert 2 is supplied in the form of a continuous strip by means of a supply 62. Herein, the strip can be supplied from a not represented supply roll on which such strip is wound up. Then, the strip is directed via the necessary guiding means 63 into the direction of the panel 1. Herein, the strip is guided along a cutting device 64, which is provided with a knife 65 in order to cut inserts with an appropriate length off the strip. According to a particular aspect, the inserts are forced over a guiding piece 66, which presses the inserts 2 open, such as represented by the arrows in FIG. 22, after which said inserts, in the somewhat pressed-open position, are provided over a tongue 12 of a passing panel.

The application is performed by means of an application device 67, for example, in the form of a driven drive roll 68, which carries the insert 2 along and transfers it onto the tongue 12.

It is noted that an applied insert 2 preferably is cut off from the supply only after it is already partially sitting on the tongue or, according to an alternative, is sitting in the groove.

It is clear that in practice also additional drive mechanisms may be provided and/or that other arrangements are possible. For example, the knife 65 can be installed at the height of or immediately after the guiding piece 66, such that the strip is not interrupted before it is carried along by the drive roll 68. Also, the drive roll 68 may possibly cooperate with a counter roll, or the guiding piece 66 can be realized in the form of a counter roll.

It is clear that an analogous system can be applied when such insert has to be mounted in the groove of a panel 1 instead of on a tongue.

Figure 23:
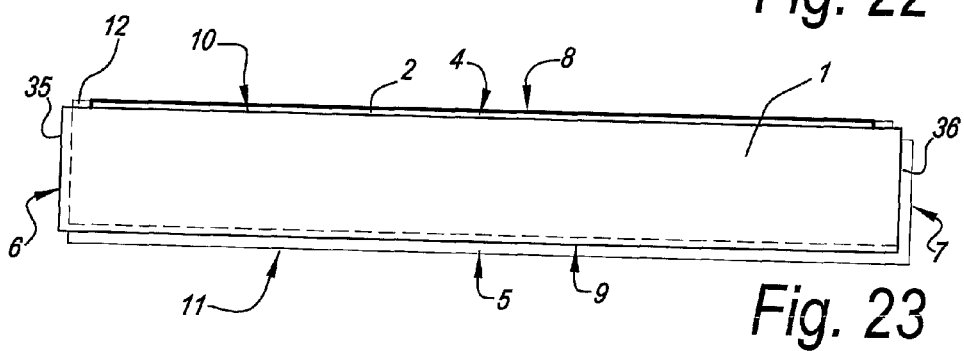
FIG. 23 represents a panel according to the invention, according to a view analogous to that of FIG. 1, however, for another embodiment.

In FIG. 23, for the sake of completeness, another panel as in FIG. 1 is illustrated, with the difference that instead of a plurality of separate inserts 2, now only one continuous insert 2 has been provided on the tongue.

Figure 24:
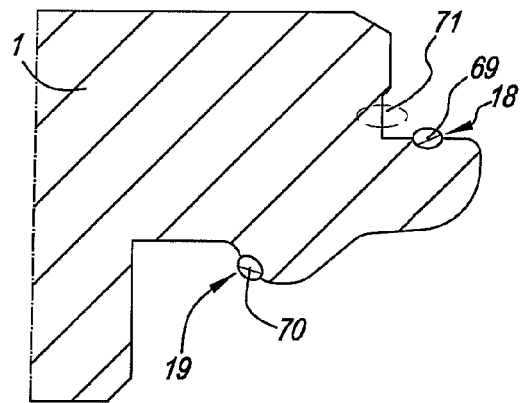
FIG. 24 represents an edge of a panel according to still another variant.

FIG. 24 represents a particular variant of the embodiment of FIG. 20, wherein the parts 18 and 19 are provided on the tongue profile in the form of locally glued-in, preferably prefabricated cord-shaped strips 69-70, wherein these strips effect a similar spacer function as the inserts from FIG. 20. Possibly, apart therefrom another additional strip 71 can be provided, if one wants to avoid contact at the upper edges of the panels, which strip then forms the aforementioned portion 26. As represented, these strips can be deposited in recesses, for example, semi-circular recesses. According to a variant, these strips can also be formed by sprayed-on and hardening material, which then fulfills the second aspect of the invention, in view of the fact that the local strips then form local covering layers of a hardening material.

Instead of said two prefabricated parts or elements 18 and 19, according to a deviating embodiment also only one of the two can be prefabricated, whereas the other is replaced by a covering layer, which has been hardened on the edge.

Figure 25:
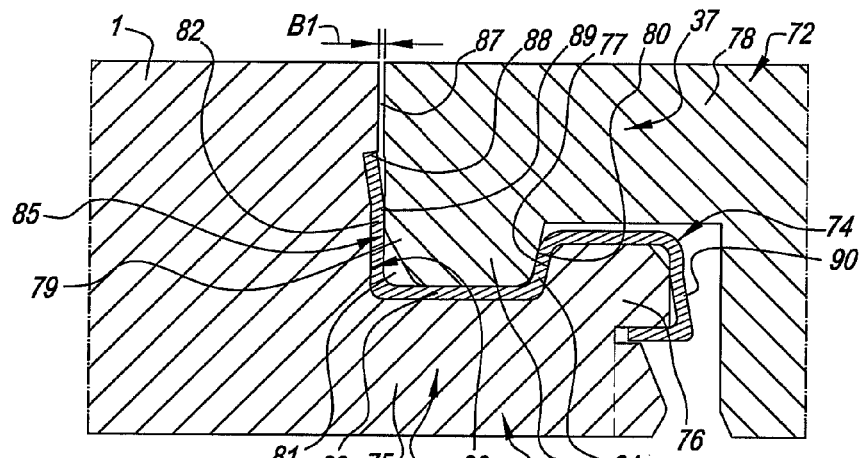
FIG. 25 in cross-section represents another variant of the invention.

In FIG. 25, a variant of the embodiment of FIG. 12 is represented, with coupling parts 37-38, which are intended in particular for the short sides of the panels, which comprise hook-shaped parts 72-73, between which, in mounted condition, an insert 74 is provided, which preferably has been provided on the locking part 38 beforehand, more particularly already during manufacture. In this example, the coupling parts provide exclusively for a horizontal locking, such by means of the engaging behind one another parts 72 and 73.

The hook-shaped part 73 consists of a lip 75 and an upwardly directed locking part 76 with a locking surface 77. The hook-shaped part 72 consists of a lip 78 and a downwardly directed locking part 79 with a locking surface 80.

The hook-shaped part 75 defines a seat 81, in which the downwardly directed locking part 79 comes to sit when the panels are coupled, such with the inclusion of the insert 74.

The insert 74 is a preferably separately manufactured strip-shaped element and comprises at least three parts 82-83-84, which function as spacing elements, to wit a first part 82, which is situated between the sides 85 and 86 directed towards each other, a second part 83 at the bottom in the seat 81, and a third part 84, which, in the coupled condition, is situated between the locking surfaces 77 and 80, wherein the first part 82 provides for that there is a gap 87 between the actual panels, at least based on nominal dimensions and still better effectively, thus, with a certain width B1.

In the preceding paragraph, by an "effective gap" it is meant that such gap, how small the width B1 may be, really is present. By a "gap based on nominal dimensions", it is meant that at least the nominal dimensions during manufacture are chosen such that a gap must be present in theory, however, due to overlapping usual tolerances is not always effectively present. In the last case, possible contacts between the basic materials of the coupled panels thus are not excluded, however, as in such embodiments there is not on all locations a contact, or in that the prevailing pressure with which such panels are adjoining each other at their upper edges then mostly is somewhat less than usual, still the advantage aimed at hereby is obtained at least partially.

As represented, the hook-shaped parts 72-73 and the insert 74 preferably are realized such that the hook-shaped parts 72-73 in the coupled condition cooperate with each other exclusively via the insert 74 and that there is no direct contact, with the advantage that creaking noises as a result of direct contact between the actual material of the panels 1 are excluded, which is particularly useful for solid wooden panels.

It is noted that the whole preferably is configured such that the insert 74 is fixedly sitting in the seat 81 due to its shape and thus cannot drop out of it.

As represented, for this purpose it is preferred that the part 82, at least in the proximity of its free upper edge, is countersunk into the side 86 and thereby cooperates with a downwardly directed collar 88.

Further, the part 82 can be somewhat buckled or bent, in de direction as illustrated, and more particularly can be provided with a buckle 89. This design contributes to that the insert 74 by itself will remain better in the seat 81 as soon as it has been provided therein.

In the example of FIG. 25, the insert 74 also comprises an additional part 90, which engages over the edge of the hook-shaped portion.

Figure 26:
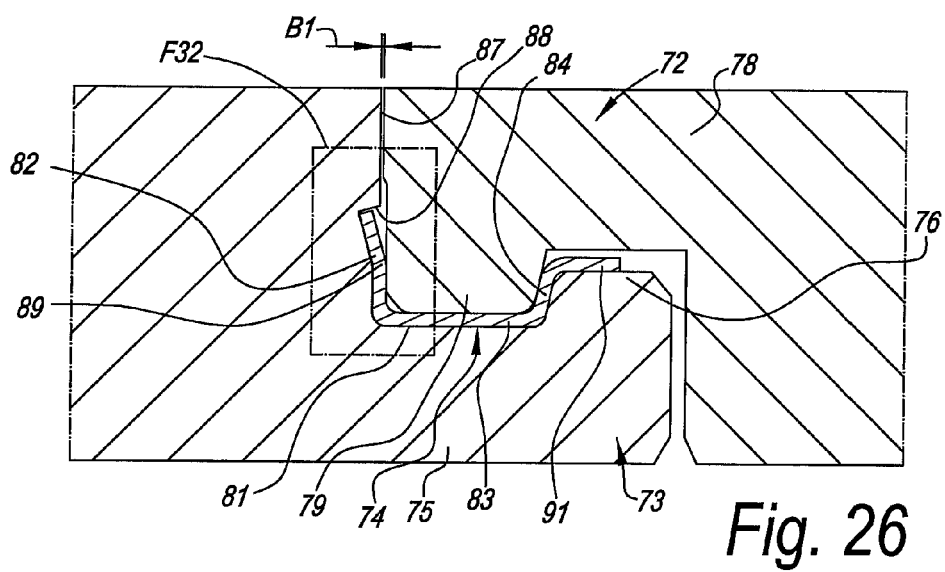
FIG. 26 represents a view similar to that of FIG. 25 for a further variant.

In FIG. 26, a variant of the embodiment of FIG. 25 is represented, wherein instead of the aforementioned part 90 now a single flange 91 is provided, by which the insert 74 is more simple and also is easier to apply.

Figure 27:
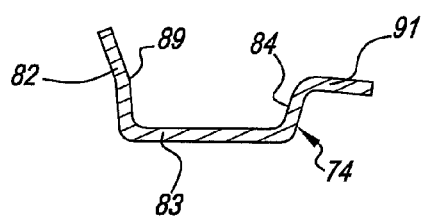
FIG. 27 represents the insert from FIG. 26, however, in the free condition thereof after manufacture.

The insert 74 preferably consists of an at least somewhat elastically deformable strip, preferably of synthetic material. In FIG. 27, the strip of the embodiment of FIG. 26 is represented in free condition. As illustrated, the shape thereof then is somewhat wider, such that this strip, when being applied in the seat 81, is clamped in a somewhat elastic manner, such that it will remain better at its place.

It is clear that the second part 83 is intended for providing a vertical support. According to a not represented alternative of FIGS. 26 and 27, the spacing portion 83 can also be replaced by a spacing portion at the location of the flange 91, wherein the locking part 79 then at the bottom preferably does not make any more contact with the insert. All other characteristics then will remain applicable.

Figure 28:
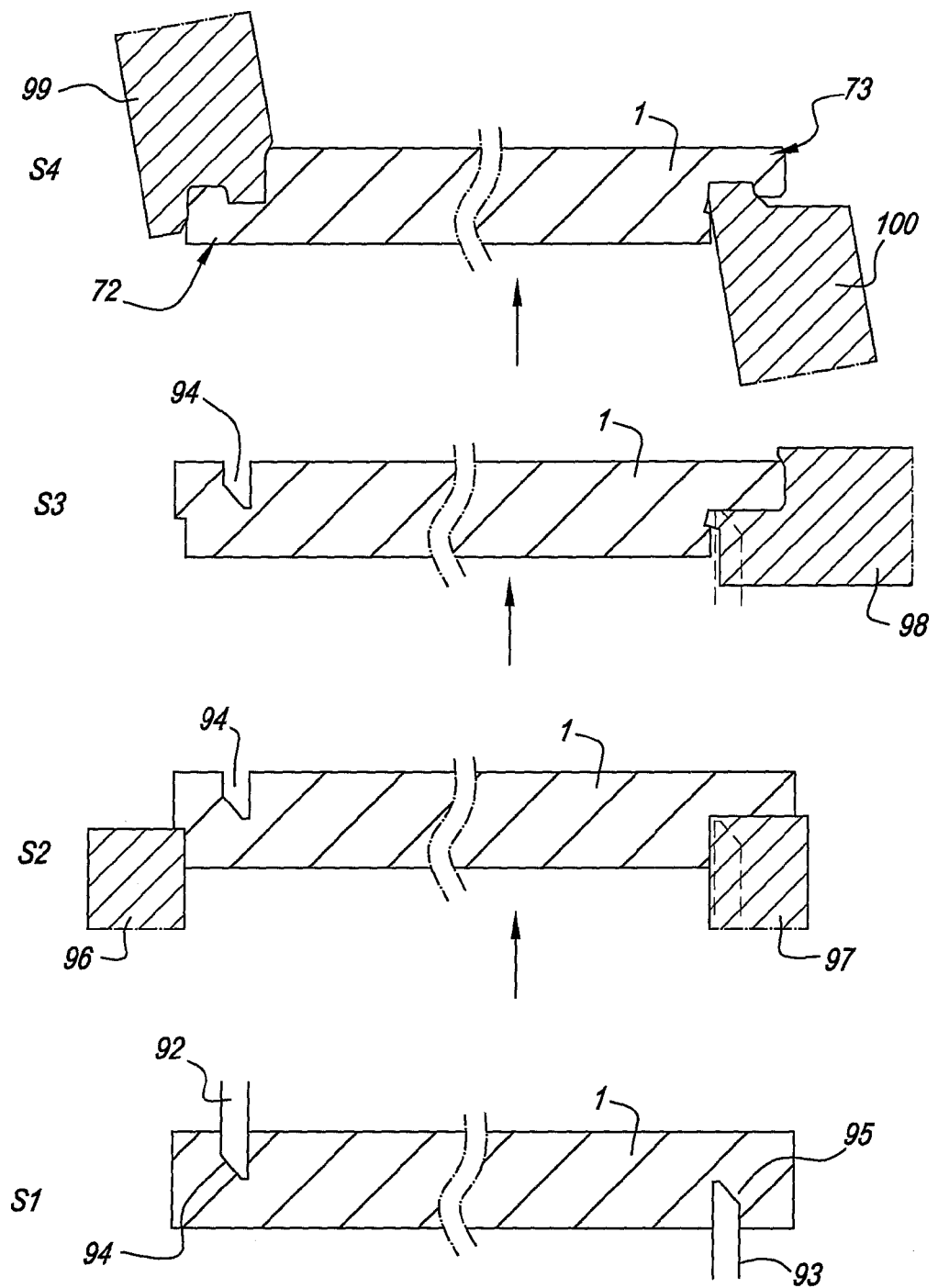
FIG. 28 schematically represents how the profiled edges of the panel illustrated in FIG. 26 can be realized.

In FIG. 28, it is schematically represented how the hook-shaped parts can be provided on the panels 1 in different steps S1 to S4, which each comprise specific cutting operations. Usually, herein the panels are placed with their decorative side downward.

In step S1, by means of cutting tools 92-93 cuts 94-95 are formed at a short distance from the flanks to be formed. This treatment is in particular of importance when the hook-shaped parts must be provided on the small sides of solid wooden planks, thus, on so-called cross grain wood. By forming such cuts 94-95 by means of this pre-treatment, a splitting of the wood during subsequent operations is excluded. The cutting tools 92-93 preferably are slitting saws.

Subsequently, in different steps S2, S3 and S4 the desired profile shapes are provided at the panels by means of cutting tools 96-97-98-99-100, more particularly milling cutters.

Figure 29:
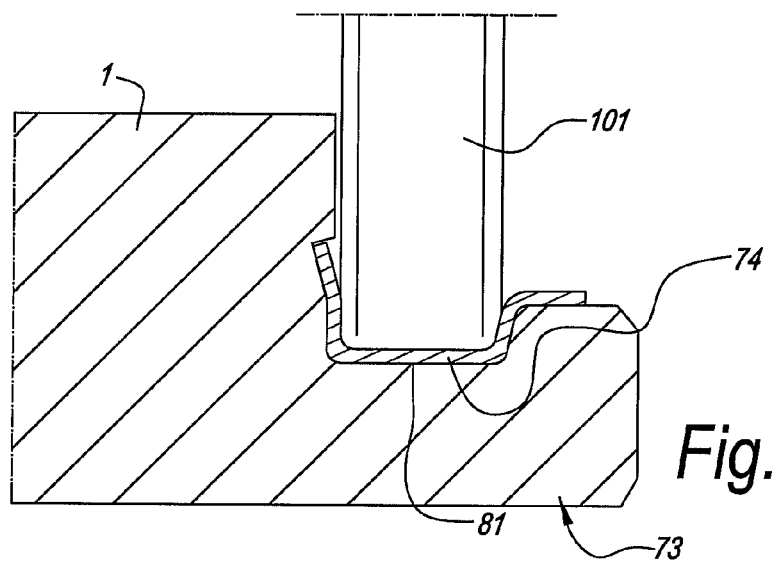
FIG. 29 represents how the insert in the embodiment of FIG. 26 is provided in the floor panel.

FIG. 29 represents how the strip-shaped insert 74 can be rolled by means of a roll 101 into the seat 81.

Figure 30:
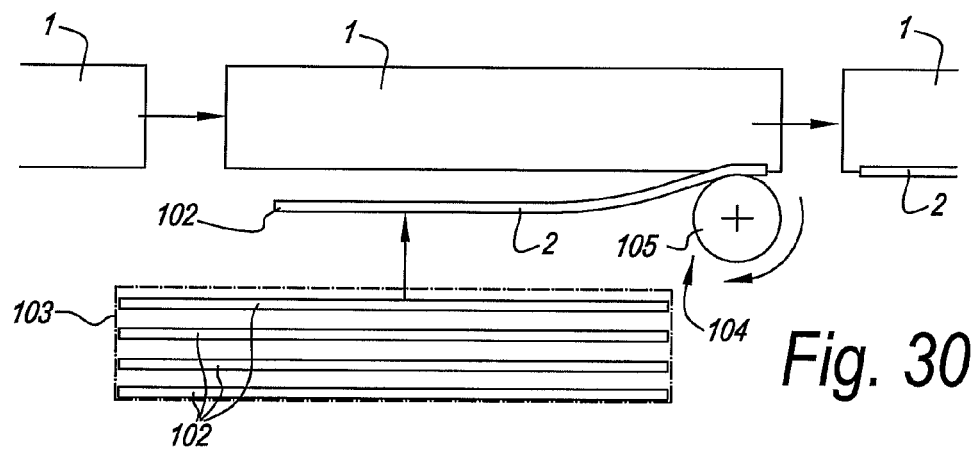
FIGS. 30 and 31 schematically represent two methods for providing inserts in floor panels.
Figure 31:
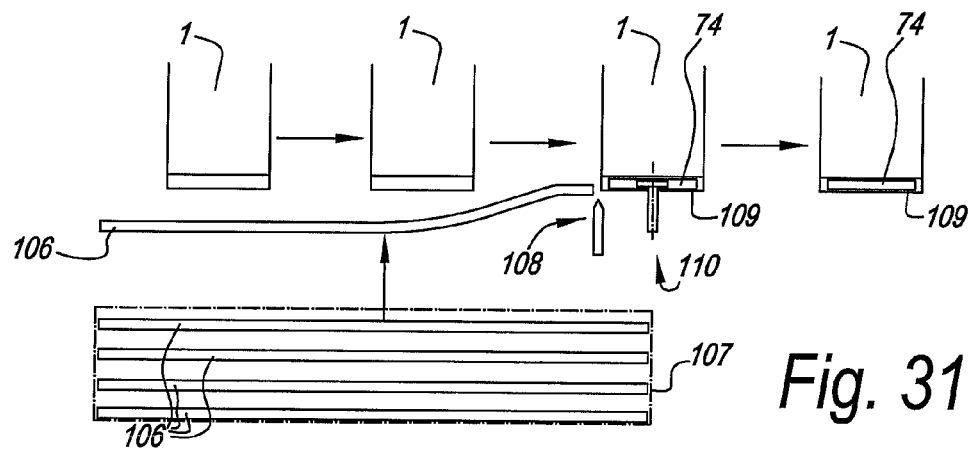

As aforementioned, the invention also relates to a number of special techniques for applying strip-shaped insertion pieces in a panel. In FIGS. 30 and 31, two applications thereof are represented schematically.

FIG. 30 schematically illustrates a technique for providing inserts 2 on the long edges of the panels 1. The particularity therein is that the inserts 2 originate from a continuously produced strip, however, are supplied to the panels in the form of pre-cut strips 102 from a magazine 103, such by means of a feeding device 104, which is only schematically indicated in the form of a roll 105. The use of such pre-cut strips offers the advantage that these are easy to handle and to orientate, such contrary to a continuous strip coming from a roll, which strip sometimes tends to position itself not in the right direction.

FIG. 31 schematically represents a technique for applying inserts 74 on the short edges of the panels 1. The particularity therein is that the inserts 74 originate from a continuously produced strip, however, are supplied in the form of pre-cut larger strips 106 from a magazine 107, which strips in their turn, by means of a dividing device 108, are cut to further smaller strips 109, which then form the actual inserts 74 and are provided on the panels 1 by means of an application device 110. This technique is also useful for providing inserts on one panel, at a distance from each other, also, for example, on the long edge.

It is noted that the application devices 104 and 110 are represented only very schematically, as the practical realization thereof can be performed in a variety of ways and is within the range of knowledge of the person skilled in the art.

In FIGS. 32 to 36 respectively a part is represented similar to the part indicated by F32 in FIG. 26, however, for different variants, with the particularity that in these embodiments respectively a vertically active locking system 111 is integrated, which provides for a vertical locking between the hook-shaped parts 72-73 and allows that the hook-shaped part 72 can be locked in the part 73 by means of a downward movement.

A first particularity consist in that, as represented, the insert 74 combines two functions, namely a vertical locking, preferably as a coupling of the "push-lock" type, and the application of a gap 87.

A second particularity consists in that herein, specific embodiments of vertically active locking systems 111 are applied, which, as will be explained herein below, are of a particular construction and which also are generally applicable in so-called "push-lock" connections, and/or in "fold-down" systems, irrespective whether those are applications with or without a gap 87, and irrespective how the insert is realized for the rest, as well as irrespective of the fact whether the insert has or has no other functions than vertical locking.

The locking systems 111 represented in FIGS. 32 to 36 all have a locking part 112 formed at an insert 74, which locking part can displace itself elastically during coupling and which, in the coupled condition, cooperates with an opposite locking part 113, preferably in the form of a stop. As represented, the locking part 113 preferably is formed in one piece from the associated hook-shaped part.

Figures 32, 33:
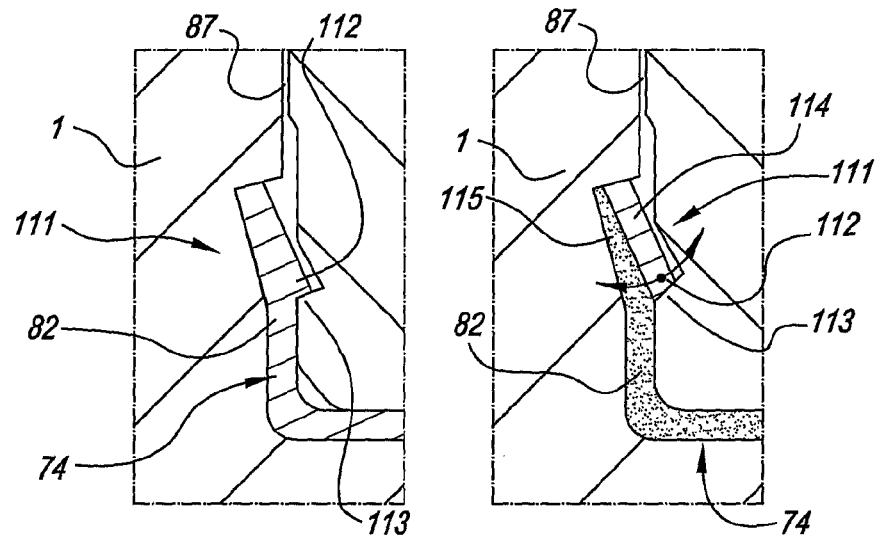
FIGS. 32 to 36 represent different variants of the portion indicated by F32 in FIG. 26.

In the embodiment of FIG. 32, a particular property consists that the locking part 112 is supported towards its back side and that the elastic displacement thereof during coupling is generated at least partially and preferably entirely by the elastic compressibility in the part 82, more particularly in the portion thereof of which the locking part 112 forms part.

In the embodiment of FIG. 33, a particularity consists in that at the height of the locking part 12 different material portions are applied, on the one hand, a first material portion 114, of which the actual locking part is formed, and a second material portion 115, which forms a back support for the locking part 112, wherein the second material portion consists of a material which can be compressed more supple than the material of the first material portion. The material portion 114, which preferably is relatively stiff and still better is very stiff, extends at least over the entire height between the locking part 113 with which it cooperates and the collar 88 for offering in this manner a stable locking by means of a relatively rigid support. The material portion 115 is situated at least behind the locking part 112, anyway at least behind the portion thereof which during coupling temporarily must be pushed away laterally. In the example, with the exception of the material portion 114 the entire insert is made as a material portion 115.

Figures 34, 35, 36:
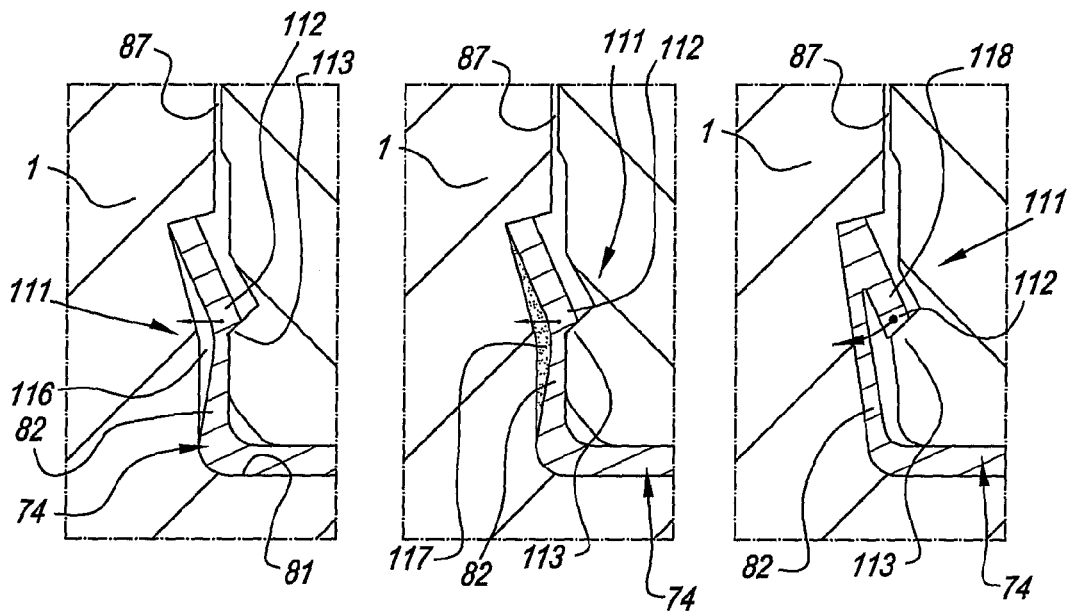

In the embodiment of FIG. 34, a particularity consists in that the locking system 111 comprises an insert 74 with a part 82, wherein this part 82, on the one hand, on one side thereof comprises the locking part 112 and, on the other hand, in its central part is bendable in respect to the extremities thereof, more particularly can be pressed into a there behind situated space 116. Herein, the part 82 preferably has a bend-out shape in the direction of the locking part 112. Also, the part 82 preferably is supported in both distal directions, in this case in upward direction by means of the collar 88, and in downward direction by the bottom of the seat 81.

FIG. 35 represents a variant of the embodiment of FIG. 34, wherein the aforementioned central part of the part 82 can be compressed towards the rear against the force of a material portion 117 functioning as an elastically compressible matter, which is made in one piece, for example, by coextrusion, with the remainder of the insert 74.

In the embodiment of FIG. 36, an insert 74 is applied with an upwardly directed part 82, which comprises a locking part 112 directly adjoining thereto, in the form of a downwardly directed lip 118, wherein the portions 82 and 118 are manufactured in one piece and continuously from the same material, with the same material characteristics.

All inserts represented in the figures preferably consist of synthetic material, thus also in the embodiments of the FIGS. 32 to 36, and preferably consist of continuously extending profiles, which are obtained by means of extrusion.

In general, it is noted that the coupling parts 10-11 as such, in other words, the tongue, the groove, as well as the locking parts, preferably are manufactured in one piece from the panel material, as in such case the invention shows its advantages in an optimum manner. The same is valid for the hook-shaped parts 72 and 73. In the case of a solid wooden plank, this means thus in one piece of one and the same wood. In the case of a panel which as such is made of a plurality of parts, which, for example, are glued to each other, it is clear that coupling parts made in one piece from the panel material as such can comprise a plurality of materials. Examples of such panels are so-called panels of prefabricated parquet, more particularly of the type also called "engineered wood" in English, or "Fertigparkett" in German, and which are composed, for example, of a top layer of a hard wood species, a bottom layer of a soft wood species, and a central layer glued between the aforementioned layers, for example, of a board material or of softwood laths, possibly with strips of a more stable material provided on one or more edges of the panel.

However, the above does not exclude that in a particular embodiment, the invention may also comprise coupling parts, wherein certain portions of the latter, for which reasons whatsoever, consist of another material than the panel material.

It is noted that everything mentioned above also applies for wall and ceiling panels. In such case, the terms applied therefor, which specifically refer to floor panels, have to be interpreted in a conform manner. For example, with a covering for a wall and ceiling, the "upper lip" has to be considered the lip which is situated closest to the decorative side, whereas the "lower lip" then is the lip which is situated closest to the opposite side. Interconnecting by means of a downward movement then, for example, with ceiling panels, must be interpreted as an upward movement. The terminology of the claims has to be interpreted within the same context.

The present invention is in no way limited to the embodiments described by way of example and represented in the figures; on the contrary may such covering, more particular floor covering, and the panels and auxiliary pieces applied therewith, be realized according to various variants, without leaving the scope of the invention. For example, such panels 1 can also be produced without a chamfer 24 and, as already mentioned, such insert or such covering layer can be provided with a spacer function, either at the tongue or at the groove, or even partially at the tongue and partially at the groove. Also, all embodiments described herein above may be realized as strips extending continuously over the major part of the edge on which they are applied, as well as shorter lengths of such strips, which then are situated at a distance from each other. Strips extending over the entire or almost entire length are preferred, as then the intended effects are guaranteed over the entire or almost entire length with certainty.

The invention claimed is:

1. A covering comprising a plurality of panels of a panel material;
    wherein said panels have coupling parts at least at two opposite edges and arranged to couple adjacent panels to each other; said coupling parts including a tongue and a groove, and locking parts preventing the drifting apart of two of the panels said locking parts including a protrusion on a lower portion of the tongue;
    wherein the groove is bordered by an upper lip and a lower lip;
    wherein the upper lip, the lower lip and the tongue are formed at least partially from the panel material;
    wherein in the coupled condition the tongue, at least with the portion thereof consisting of the panel material, reaches underneath a portion of the upper lip consisting of the panel material; and
    wherein between at least two of the coupled panels, between the tongue and groove, at least one separately manufactured insert is present, and removable the insert having at least two portions functioning as fixed spacing elements including a first portion between the upper side of the tongue and the lower side of the upper lip, and a second portion between the locking parts, respectively.

2. The covering of claim 1, said covering being a floor covering.

3. The covering of claim 1, wherein the panel material consists of solid wood.

4. The covering of claim 1, wherein said insert and profiles with which the two opposite edges are equipped, provide for that at the respective edges, viewed in cross-section, there is no direct contact between the actual panels along the entirety of the opposite edges as the insert provides an intermediate contact between the actual panels.

5. The covering of claim 1, wherein at least next to the upper edge of the two opposite edges of the panels, there is a visible gap.

6. The covering of claim 1, wherein the insert is made as a wrapping or sock.

7. The covering of claim 1, wherein the insert substantially is single-walled.

8. The covering of claim 1, wherein the insert, viewed in cross-section, in a mounted condition is formed at least of a first portion extending in the height above the tongue, a second portion extending substantially parallel to the plane of the panels along the upper side of the tongue, a third portion extending around the tip of the tongue, and a fourth portion extending underneath the locking part provided at the tongue.

9. The covering of claim 1, wherein the insert is configured such that it can be fixedly snapped over or in the respective edge portion.

10. The covering of claim 1, wherein the panels, at least at the edges where the at least one insert is present, fit into each other with a pretension forcing the panels towards each other.

11. The covering of claim 1, wherein the insert consists of synthetic material.

12. The covering of claim 1, wherein said insert and profiles with which the two opposite edges are equipped, provide for that at the respective edges, viewed in cross-section, there is no direct contact between the actual panels at the location of the inserts as the insert provides an intermediate contact between the actual panels and there is direct contact of the actual panels at a location above the inserts defined by opposed directly contacting parts.

13. A panel substantially made from a panel material, wherein said panel has first coupling parts at least at two opposite edges and arranged to couple adjacent panels to each other;
    wherein the first coupling parts include a tongue and a groove, and locking parts preventing the drifting apart of two such adjacent panels said locking parts including a protrusion on a lower portion of the tongue;
    wherein the groove is bordered by an upper lip and a lower lip; wherein the upper lip, the lower lip and the tongue are formed at least partially from the aforementioned panel material;
    wherein in a coupled condition of two such adjacent panels, the tongue, at least with a portion consisting of the panel material, reaches underneath a portion of the upper lip consisting of the panel material;
    wherein the panel includes at least one associated insert arranged to be provided between the first coupling parts of two such adjacent panels; and wherein the first coupling parts and the insert are configured such that, in the coupled condition of two such adjacent panels, the insert fits between the tongue and the groove of the first coupling parts, wherein the insert includes at least two portions functioning as fixed spacing elements, a first portion between the upper side of the tongue and the lower side of the upper lip, and a second portion between the locking parts of the coupled panels, respectively, wherein said insert is removable.

14. The panel of claim 13, wherein one or more of the at least one insert is on one of the opposite edges comprising the tongue.

15. The panel of claim 13, wherein the panel is a floor panel consisting of a solid wooden plank, wherein said coupling parts are formed in one piece from the wood, whereas the at least one insert applied therewith consists of a synthetic material.

16. The panel of claim 13, wherein the panel is oblong and formed as a plank having a pair of long sides and a pair of short sides, wherein said insert is present at one of the long sides and the long sides form the first coupling parts;
    wherein at the short sides, second coupling parts are present, which during coupling provide at least for a horizontal locking including a "drop-in" type or a "push-lock" type, and including hook-shaped portions with locking surfaces, of which one hook-shaped portion defines a seat for the other; and wherein one of the at least one insert is present at the location of the second coupling parts along the short sides.

* * * * *